(12) United States Patent
Komatsu et al.

(10) Patent No.: US 9,806,589 B2
(45) Date of Patent: Oct. 31, 2017

(54) BASKET-TYPE ROTOR PRODUCTION METHOD AND BASKET-TYPE ROTOR

(71) Applicant: MITSUBISHI ELECTRIC CORPORATION, Chiyoda-ku (JP)

(72) Inventors: Taiga Komatsu, Chiyoda-ku (JP); Hideaki Arita, Chiyoda-ku (JP); Akihiro Daikoku, Chiyoda-ku (JP); Yoshihiro Miyama, Chiyoda-ku (JP); Moriyuki Hazeyama, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/904,339

(22) PCT Filed: Dec. 15, 2014

(86) PCT No.: PCT/JP2014/083124
§ 371 (c)(1),
(2) Date: Jan. 11, 2016

(87) PCT Pub. No.: WO2015/093433
PCT Pub. Date: Jun. 25, 2015

(65) Prior Publication Data
US 2016/0164387 A1 Jun. 9, 2016

(30) Foreign Application Priority Data

Dec. 16, 2013 (JP) .................. 2013-259039

(51) Int. Cl.
*H02K 17/16* (2006.01)
*H02K 1/26* (2006.01)
*H02K 15/00* (2006.01)

(52) U.S. Cl.
CPC ............ *H02K 17/165* (2013.01); *H02K 1/26* (2013.01); *H02K 15/0012* (2013.01); *H02K 17/16* (2013.01)

(58) Field of Classification Search
CPC ........ H02K 17/16; H02K 17/165; H02K 1/26; H02K 15/0012; H02K 15/0018;
(Continued)

(56) References Cited

U.S. PATENT DOCUMENTS 2,386,138 A * 10/1945 Pancher ............... H02K 17/165
310/211
2,657,324 A * 10/1953 Korski ................. H02K 17/165
164/109

(Continued)

FOREIGN PATENT DOCUMENTS

CN 102480180 A 5/2012
JP 58-112442 7/1983
(Continued)

OTHER PUBLICATIONS

Naruse Tomohiro; Hattori Toshio, Rotor of Squirrel Cage Electrical Rotary Machine, Dec. 4, 1998, Hitachi LTD, JPH 10322990 (English Machine Translation).*
International Search Report dated Feb. 10, 2015 in PCT/JP14/83124 Filed Dec. 15, 2014.
Combined Office Action and Search Report dated Jun. 16, 2017 in Chinese Patent Application No. 201480051459.2 (with partial English translation).

*Primary Examiner* — Bernard Rojas
*Assistant Examiner* — Alexander Singh
(74) *Attorney, Agent, or Firm* — Oblon, McClelland, Maier & Neustadt, L.L.P.

(57) ABSTRACT

A squirrel-cage rotor manufacturing method capable of suppressing, at the time of performing die-casting, formation of gaps between closing portions and a rotor core at radially outer parts of rotor slots, or generation of a thermal stress in the rotor core as a result of expansion of the closing portions. The squirrel-cage rotor manufacturing method includes:

(Continued)

arranging, through die-casting, conductors into rotor slots that are formed along a radially outer part of a rotor core; and performing the die-casting under a state in which radially outer parts of the rotor slots are closed with closing portions made of the same material as a material of the rotor core.

12 Claims, 16 Drawing Sheets

(58) Field of Classification Search
CPC ........ H02K 15/02; H02K 15/08; H02K 15/09; H02K 15/095; H02K 17/18; H02K 17/185
USPC .............. 310/211, 156.78, 156.81, 212, 125; 29/598, 596
See application file for complete search history.

(56) References Cited

U.S. PATENT DOCUMENTS

| | | | |
|---|---|---|---|
| 2011/0081263 A1* | 4/2011 | Yoshino | F04C 23/008 417/410.1 |
| 2012/0126657 A1* | 5/2012 | Gerard | H02K 15/0012 310/211 |

FOREIGN PATENT DOCUMENTS

| | | |
|---|---|---|
| JP | 59-106865 | 6/1984 |
| JP | 61-157249 | 7/1986 |
| JP | 7-288958 | 10/1995 |
| JP | 10322990 A * | 12/1998 |
| JP | 11-206080 | 7/1999 |

* cited by examiner

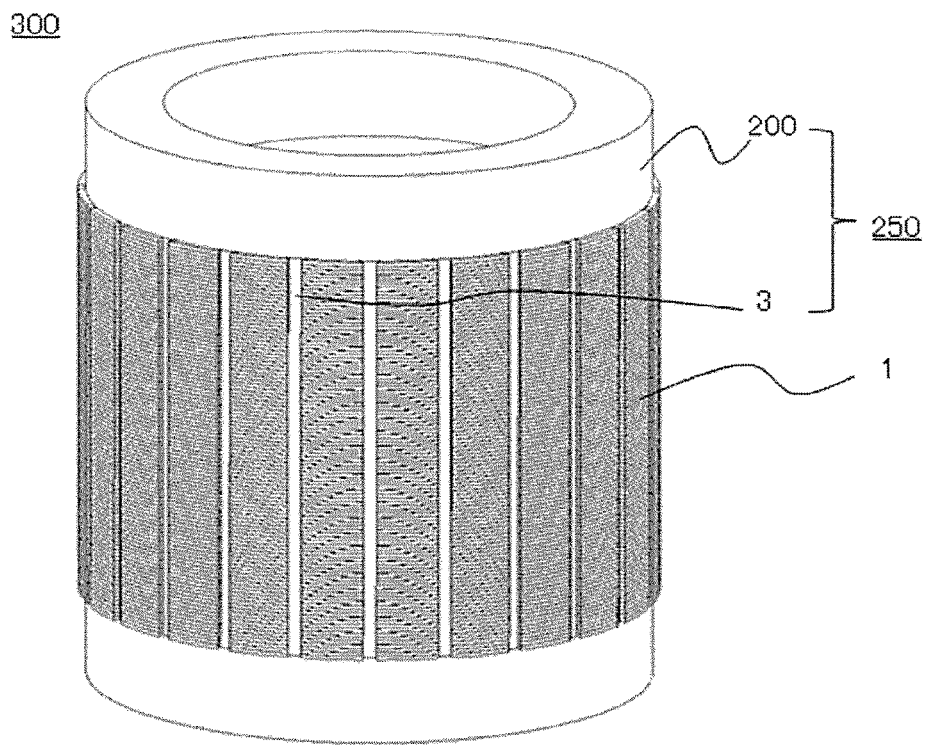
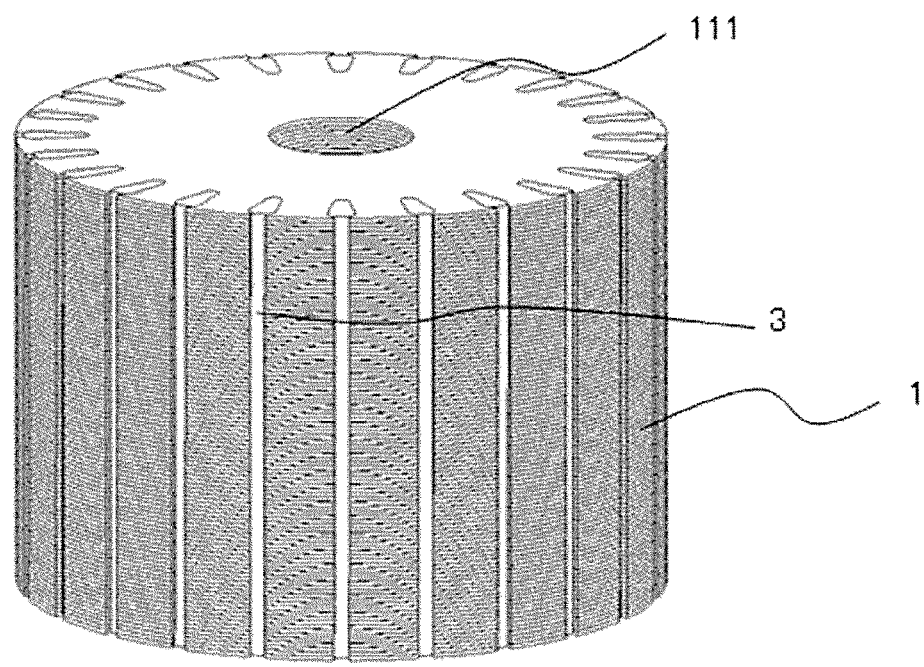

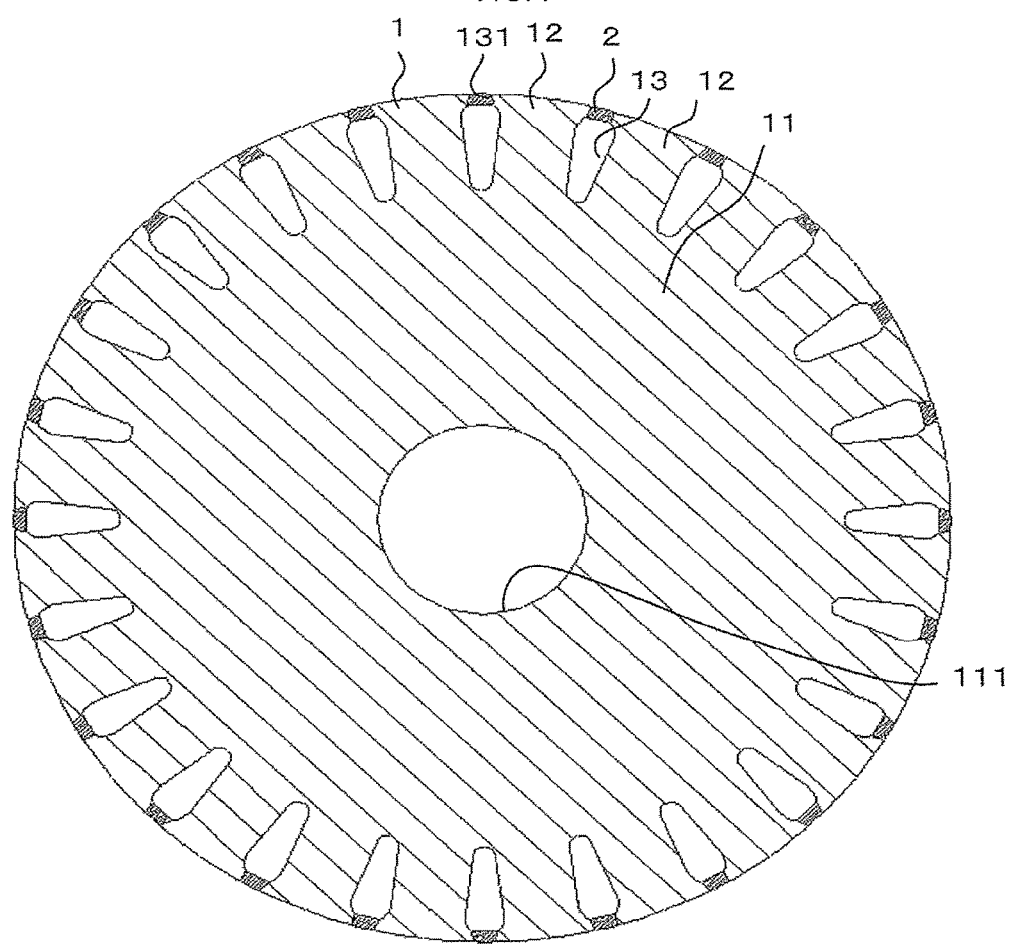

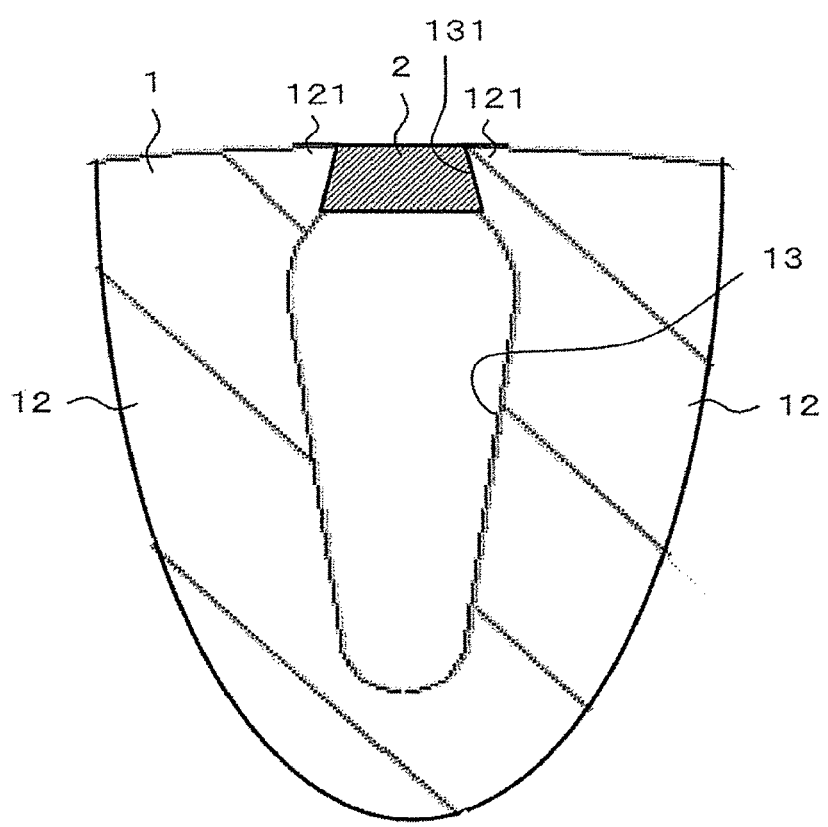

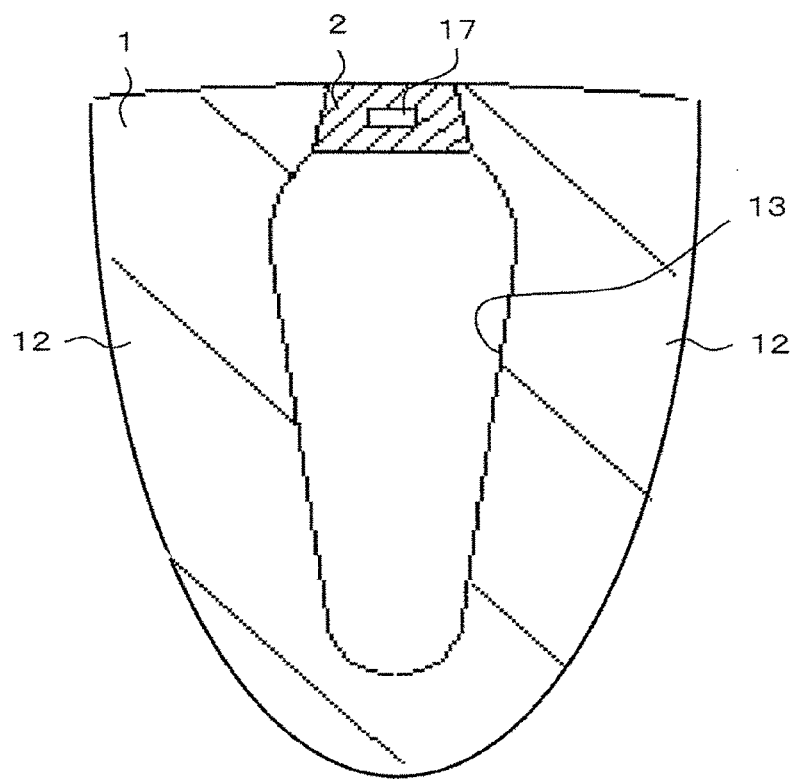
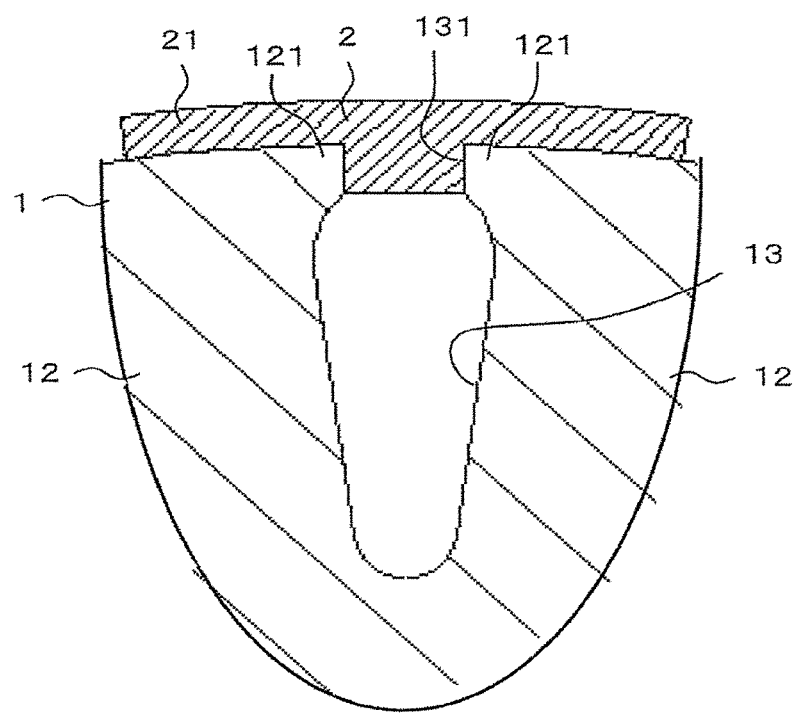

BASKET-TYPE ROTOR PRODUCTION METHOD AND BASKET-TYPE ROTOR

TECHNICAL FIELD

The present invention relates to a squirrel-cage rotor manufacturing method involving arranging conductors into rotor slots of a rotor core through die-casting, and to a squirrel-cage rotor including conductors arranged in rotor slots through die-casting.

BACKGROUND ART

Hitherto, there has been known a squirrel-cage rotor manufacturing method involving arranging, through die-casting, conductors into rotor slots that are formed along a radially outer part of a rotor core, and performing the die-casting under a state in which radially outer parts of the rotor slots are closed with closing portions made of an elastic material (refer to, for example, Patent Literature 1).

CITATION LIST

Patent Literature

[PTL 1] JP 61-157249 A

SUMMARY OF INVENTION

Technical Problem

However, at the time of performing the die-casting, liquefied conductors are poured into the rotor slots, and hence heat of the conductors is transferred to the closing portions and the rotor core. Therefore, the closing portions and the rotor core are heated. The closing portions and the rotor core are different from each other in linear expansion coefficient. Thus, when the closing portions and the rotor core are heated, gaps are formed between the closing portions and the rotor core at the radially outer parts of the rotor slots, or expansion of the closing portions causes the conductors to be reduced in cross-sectional area. When the gaps are formed between the closing portions and the rotor core in this way, the conductors flow into the radially outer parts of the rotor slots. As a result, short-circuit magnetic paths are formed to cause stray loss. When the conductors are reduced in cross-sectional area, secondary copper loss increases. As a result, there arises a problem in that rotary electric machines are deteriorated in efficiency and output characteristic.

The present invention has been made to provide a squirrel-cage rotor manufacturing method and a squirrel-cage rotor that are capable of suppressing, at the time of performing die-casting, formation of gaps between closing portions and a rotor core at radially outer parts of rotor slots, or reduction in cross-sectional area of conductors as a result of expansion of the closing portions.

Solution to Problem

According to one embodiment of the present invention, there is provided a squirrel-cage rotor manufacturing method, including: arranging, through die-casting, a conductor into a rotor slot formed along a radially outer part of a rotor core; and performing the die-casting under a state in which a radially outer part of the rotor slot is closed with a closing portion made of the same material as a material of the rotor core.

According to one embodiment of the present invention, there is provided a squirrel-cage rotor, including: a rotor core including: a plurality of rotor core sheets that are laminated in an axial direction of the squirrel-cage rotor; and a rotor slot formed along a radially outer part of the rotor core; and a conductor formed at a radially inner part of the rotor slot, in which a surface of the conductor, which is exposed on a radially outer side, has a projection formed at a position along lamination surfaces of the plurality of rotor core sheets.

According to one embodiment of the present invention, there is provided a squirrel-cage rotor, including: a rotor core including: a plurality of rotor core sheets that are laminated in an axial direction of the squirrel-cage rotor; and a rotor slot formed along a radially outer part of the rotor core; and a conductor formed at a radially inner part of the rotor slot, in which a surface of the conductor, which is exposed on a radially outer side, has: first surfaces including positions along lamination surfaces of the plurality of rotor core sheets; and second surfaces different in surface roughness from the first surfaces.

Advantageous Effects of Invention

In the squirrel-cage rotor manufacturing method and the squirrel-cage rotor according to the present invention, the die-casting is performed under the state in which the radially outer parts of the rotor slots are closed with the closing portions made of the same material as that of the rotor core. Thus, linear expansion coefficients of the closing portions and the rotor core are equal to each other. As a result, at the time of performing the die-casting, formation of the gaps between the closing portions and the rotor core at the radially outer parts of the rotor slots, or reduction in cross-sectional area of the conductors as a result of the expansion of the closing portions may be suppressed.

BRIEF DESCRIPTION OF DRAWINGS

FIG. 2 is a perspective view for illustrating a squirrel-cage rotor according to the first embodiment of the present invention.

FIG. 3 is a perspective view in which end rings of FIG. 2 are omitted.

FIG. 4 is a cross-sectional view for illustrating a rotor core with closing portions for a squirrel-cage rotor according to the first embodiment of the present invention.

FIG. 5 is an enlarged view for illustrating a main part in FIG. 4.

FIG. 17 is an enlarged view for illustrating a main part of a rotor core with closing portions for a squirrel-cage rotor according to a fifth embodiment of the present invention.

FIG. 18 is an enlarged view for illustrating a main part of a rotor core with closing portions for a squirrel-cage rotor according to a sixth embodiment of the present invention.

DESCRIPTION OF EMBODIMENTS

First Embodiment

Figure 1:
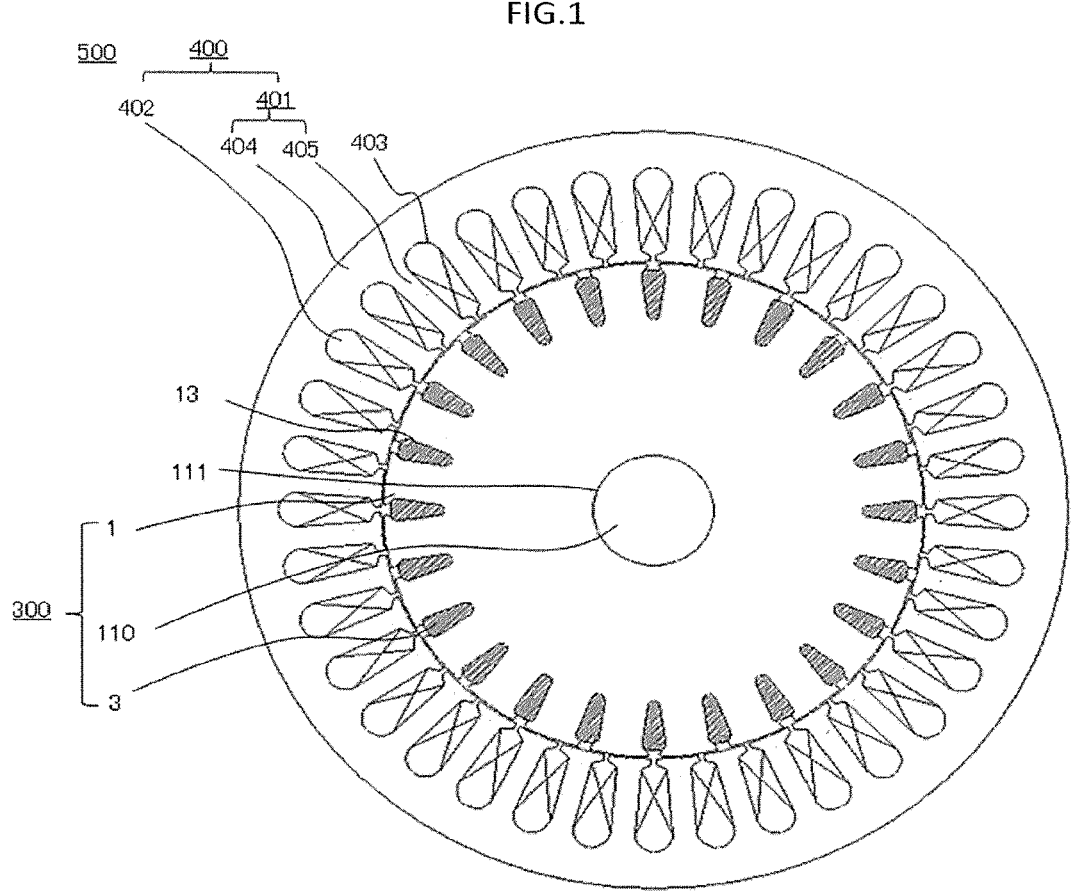
FIG. 1 is a cross-sectional view for illustrating a rotary electric machine according to a first embodiment of the present invention.

FIG. 1 is a cross-sectional view for illustrating a rotary electric machine according to a first embodiment of the present invention. Note that, the cross-sectional view is taken along a plane orthogonal to an axis of a rotary electric machine 500.

The rotary electric machine 500 includes a stator 400 and a squirrel-cage rotor 300 arranged inside the stator 400. In addition, the rotary electric machine 500 further includes a cylindrical frame (not shown) and housings (not shown) fixed to both side end surfaces of this frame.

The stator 400 is fixed to an inner wall surface of the frame. The stator 400 includes a stator core 401 formed by laminating magnetic members such as a thin electromagnetic steel sheet, and thirty-six coils 402 received in thirty-six stator slots 403 that are formed along a radially inner part of the stator core 401. The stator core 401 includes an annular core back 404, and eighteen stator teeth 405 equiangularly formed so as to extend radially inward from the core back 404 (direction of a length of a magnetic air gap). Each of the thirty-six stator slots 403 is formed between adjacent stator teeth 405.

The coils 402 are arranged in a pattern of what is called distributed winding, specifically, the coil is wound around one stator slot 403 and another stator slot 403, which is three slots away from the one stator slot 403 in a circumferential direction. In FIG. 1, twelve poles are arranged, and one slot is arranged per pole and phase. Note that, the number of the poles is not limited to twelve, and may be less than twelve.

The squirrel-cage rotor 300 includes a shaft 110 having both end portions supported in a freely rotatable manner by bearings (not shown) fitted respectively to the housings on both the side end surfaces, a rotor core 1 formed by fitting and fixing a shaft hole 111 to an outer peripheral surface of the shaft 110, and twenty-four conductors 3 arranged respectively at radially inner parts of twenty-four rotor slots 13 equiangularly formed along a radially outer part of the rotor core 1.

Note that, the numbers of the stator slots 403 and the rotor slots 13 are not limited to the above-mentioned numbers, and may be changed depending on the design.

The rotary electric machine 500 is used mainly as an induction machine. Note that, the rotary electric machine 500 may be used as a synchronous machine configured to use the conductors 3 as dampers.

FIG. 2 is a perspective view for illustrating the squirrel-cage rotor according to this embodiment. FIG. 3 is a perspective view in which end rings 200 of FIG. 2 are omitted. The squirrel-cage rotor 300 illustrated in FIG. 2 includes the rotor core 1 being formed by laminating a predetermined number of magnetic steel sheets and having a cylindrical outer peripheral surface, and a squirrel-cage conductor 250. The rotor core 1 has formed therein the shaft hole 111 to which the outer peripheral surface of the shaft 110 is fitted. The squirrel-cage conductor 250 includes the conductors 3 and the end rings 200 short-circuited at both axial ends of the conductors 3 and arranged on both axial end surfaces of the rotor core 1. The conductors 3 are received respectively in the rotor slots 13 formed along the radially outer part of the rotor core 1. An outer diameter of each of the end rings 200 is set substantially equal to an outer diameter of the conductors 3.

FIG. 4 is a cross-sectional view for illustrating the rotor core with closing portions for a squirrel-cage rotor according to the first embodiment of the present invention. FIG. 5 is an enlarged view for illustrating a main part in FIG. 4. In FIG. 4, the cross-section of the rotor core with closing portions for a squirrel-cage rotor is taken along a plane orthogonal to an axial direction. The rotor core with closing portions for a squirrel-cage rotor includes the rotor core 1 having a substantially cylindrical shape, and a plurality of closing portions 2 arranged along the radially outer part of the rotor core 1. A radial direction in this example refers to a radial direction of the rotor core 1.

The rotor core 1 is formed by laminating a plurality of rotor core sheets, which are formed through punching of the thin steel sheets with die sets, in a thickness direction, that is, the axial direction of the squirrel-cage rotor 300. The rotor core 1 includes a disc-like rotor core central portion 11, and a plurality of rotor teeth 12 protruding to a radially outer side from the rotor core central portion 11. At a central part of the rotor core central portion 11, the shaft hole 111 through which the shaft 110 (not shown) is inserted is formed. The rotor teeth 12 are equiangularly arranged. Along the radially outer part of the rotor core 1, each of the rotor slots 13 is formed between the adjacent rotor teeth 12. At both circumferential end portions of each of the rotor teeth 12, flange portions 121 are formed so as to protrude to a circumferentially outer side. The flange portions 121 are each formed so that a protruding amount thereof becomes larger from the radially inner side toward the radially outer side. In this example, the circumferential direction refers to a circumferential direction of the rotor core 1.

In this example, the twenty-four rotor slots 13 are formed in the rotor core 1. A radially outer part of each of the rotor slots 13 serves as a rotor slot opening 131 opened to the radially outer side. The rotor slot openings 131 are formed so as to prevent short-circuiting of magnetic paths when the magnetic paths are formed in the squirrel-cage rotor.

The closing portions 2 are charged in the rotor slot openings 131 so as to be held in contact with the flange portions 121. The closing portions 2 are formed by laminating a plurality of closing sheets that are parts of the steel sheets cut off from the rotor core 1 at the time of forming the rotor core 1 through punching of the thin steel sheets with the die sets. The closing portions 2 are formed so as to be reduced in circumferential width from the radially inner side toward the radially outer side in conformity with a shape of the flange portions 121. Through die-casting, the molten and liquefied conductors 3 flow into the rotor slots 13 through an axial end portion of the rotor core 1, to thereby arrange the conductors 3 at the radially inner parts of the rotor slots 13. As examples of the conductor 3, there are given conductive solid materials such as a copper material and an aluminum material.

Hitherto, there has been known a squirrel-cage rotor manufacturing method involving arranging the conductors in the rotor slots 13 through die-casting under a state in which the rotor slot openings 131 are not closed by the closing portions 2. However, when this method is employed, the liquefied conductors flow into the rotor slot openings 131. As a result, the conductors come to positions on the short-circuit magnetic paths, to thereby cause problems in that stray loss occurs, and that the rotary electric machine is deteriorated in efficiency and output characteristic. Meanwhile, in order to solve such problems, hitherto, there has been known a squirrel-cage rotor manufacturing method involving arranging the conductors in the rotor slots 13 through die-casting under a state in which insulators are charged in the rotor slot openings 131. However, when this method is employed, the conductors liquefied by being heated flow into the rotor slots 13 at the time of performing the die-casting, and hence heat of the conductors is transferred to the insulators and the rotor core 1. Therefore, the insulators and the rotor core are heated to enter a high-temperature state. At this time, thermal expansion occurs in the insulators and the rotor core. The insulators and the rotor core 1 are different from each other in linear expansion coefficient, and hence problems as follows occur depending on magnitude relationship between the linear expansion coefficient of the insulators and the linear expansion coefficient of the rotor core 1.

When the linear expansion coefficient of the rotor core 1 is higher than the linear expansion coefficient of the insulators, the rotor core 1 expands, and hence gaps are formed between the rotor core 1 and the insulators. When the liquefied conductors are poured into the rotor slots 13 through the die-casting, the liquefied conductors are charged in the rotor slots 13 without gaps. As a result, the liquefied conductors poured in the rotor slots 13 enter a high-pressure state. Thus, when the gaps are formed between the rotor core 1 and the insulators, the liquefied conductors flow into the gaps. As a result, the liquefied conductors flow into the rotor slot openings 131, and come to the positions on the short-circuit magnetic paths. In this way, stray loss occurs in the conductors having flowed into the rotor slot openings 131, resulting in the problem in that the rotary electric machine is deteriorated in efficiency and output characteristic.

Meanwhile, when the linear expansion coefficient of the rotor core 1 is lower than the linear expansion coefficient of the insulators, the insulators expand, and hence the insulators enter the rotor slots 13. As a result, in the rotor slots 13, the insulators exist in parts into which the conductors are expected to flow. Thus, a cross-sectional area of the conductors to be obtained is smaller than an originally expected cross-sectional area.

As a result, secondary copper loss to occur on the squirrel-cage rotor side becomes larger than is expected, resulting in the problem in that the rotary electric machine is deteriorated in efficiency and output characteristic.

In addition, when a metal such as iron is charged as an alternative to the insulators into the rotor slot openings 131, a difference in linear expansion coefficient between the rotor core 1 and the metal may be smaller than a difference in linear expansion coefficient between the rotor core 1 and the insulators. However, the rotor core 1, which is formed of the steel sheets containing iron as a main component, contains other additives. Thus, the rotor core 1 and the metal such as iron are unequal to each other in thermal expansion coefficient. Therefore, when the linear expansion coefficient of the rotor core 1 is higher than the linear expansion coefficient of the insulators, the rotor core 1 expands, and hence the gaps are formed between the rotor core 1 and the insulators. The liquefied conductors poured in the rotor slots 13 at the time of die-casting enter a high-pressure state, and hence the liquefied conductors flow into the gaps. In this way, the liquefied conductors flow into the rotor slot openings 131, and are arranged on the short-circuit magnetic paths. As a result, the stray loss occurs in the conductors having flowed into the rotor slot openings 131, resulting in the problem in that the rotary electric machine is deteriorated in efficiency and output characteristic.

Meanwhile, when the linear expansion coefficient of the rotor core 1 is lower than the linear expansion coefficient of the insulators, the insulators expand, and hence the insulators enter the rotor slots 13. Thus, in the rotor slots 13, the insulators exist in the parts into which the conductors are expected to flow. As a result, the cross-sectional area of the conductors to be obtained is smaller than the originally expected cross-sectional area. Thus, the secondary copper loss to occur in the conductors of the squirrel-cage rotor becomes larger than is expected, resulting in the problem in that the rotary electric machine is deteriorated in efficiency and output characteristic.

In the present invention, the closing portions 2 formed by laminating the closing sheets formed through punching of the same material as that of the rotor core 1, specifically, the same steel sheet material that is subjected to punching for obtaining the rotor core sheets to be formed into the rotor core 1 are charged in the rotor slot openings 131, and the liquefied conductors 3 are charged in the rotor slots 13 through die-casting. In this way, the closing portions 2 are charged into the rotor slot openings 131. The linear expansion coefficient of the rotor core 1 and the linear expansion coefficient of the closing portions 2 are equal to each other. Thus, even when the molten and liquefied conductors 3 flow into the rotor slots 13 through the axial end portion of the rotor core 1 through the die-casting, the gaps are not formed between the rotor core 1 and the closing portions 2. At the time of performing the die-casting, the liquefied conductors 3 are charged into the rotor slots 13, and the liquefied conductors 3 charged in the rotor slots 13 enter a high-pressure state. As a result, a radially outward force is generated in the closing portions 2. However, the closing portions 2 are formed so as to be reduced in circumferential width from the radially inner side toward the radially outer side. Thus, a repulsive force against the radially outward force applied to the closing portions 2 is generated in the flange portions 121. With this, the closing portions 2 are not moved to the radially outer side, and a desired cross-sectional shape of the conductors can be obtained. In this way, the conductors 3 can be arranged in the rotor slots 13 without leakage of the liquefied conductors 3 through the rotor slot openings 131.

Further, the closing portions 2, which are formed by laminating the closing sheets corresponding respectively to the rotor core sheets formed through punching of the same steel sheet material that is subjected to punching for obtaining the closing sheets, are charged in the rotor slot openings 131. With this configuration, dimensions of a shape of a part corresponding to each of the rotor slot openings 131 of each of the rotor core sheets, and dimensions of a shape of the corresponding closing sheet are set equal to each other. Thus, even when the liquefied conductors 3 are charged into the rotor slots 13 through die-casting, the gaps are not formed between the rotor core 1 and the closing portions 2. Therefore, influence of a dimensional tolerance between the rotor core 1 and the closing portions 2 is eliminated at the rotor slot openings 131. With this, the conductors 3 can be arranged in the rotor slots 13 without leakage of the liquefied conductors 3 through the rotor slot openings 131.

Further, the following manufacturing method is conceivable. Instead of the closing portions 2, a die-casting mold (not shown) having the same shape as that of the closing portions 2 may be charged into the rotor slot openings 131, and the liquefied conductors 3 may be charged into the rotor slots 13. In this case, a dimensional tolerance at the time of the punching is generated in the shape of the rotor slot openings 131 of the rotor core 1. Thus, the squirrel-cage rotors 300 each need a die-casting mold formed in accordance with the dimensions of the shape of the rotor slot openings 131 of the rotor core 1. Therefore, preparation of the die-casting molds for the respective squirrel-cage rotors 300 to be mass-produced leads to a larger number of manufacturing steps and higher equipment cost, and hence is disadvantageous in terms of productivity.

In contrast, as for the rotor core with closing portions for a squirrel-cage rotor according to this embodiment, the die-casting molds need not be prepared for the respective squirrel-cage rotors 300 to be mass-produced. Thus, the number of manufacturing steps and the equipment cost can be suppressed, which is advantageous in terms of productivity. Further, as described above, the linear expansion coefficients and the dimensions of the shapes of the rotor core 1 and the closing portion 2 in each of the rotor slot openings 131 can be set equal to each other. With this, the conductors 3 can be arranged in the rotor slots 13 without leakage of the liquefied conductors 3 through the rotor slot openings 131.

Figure 6:
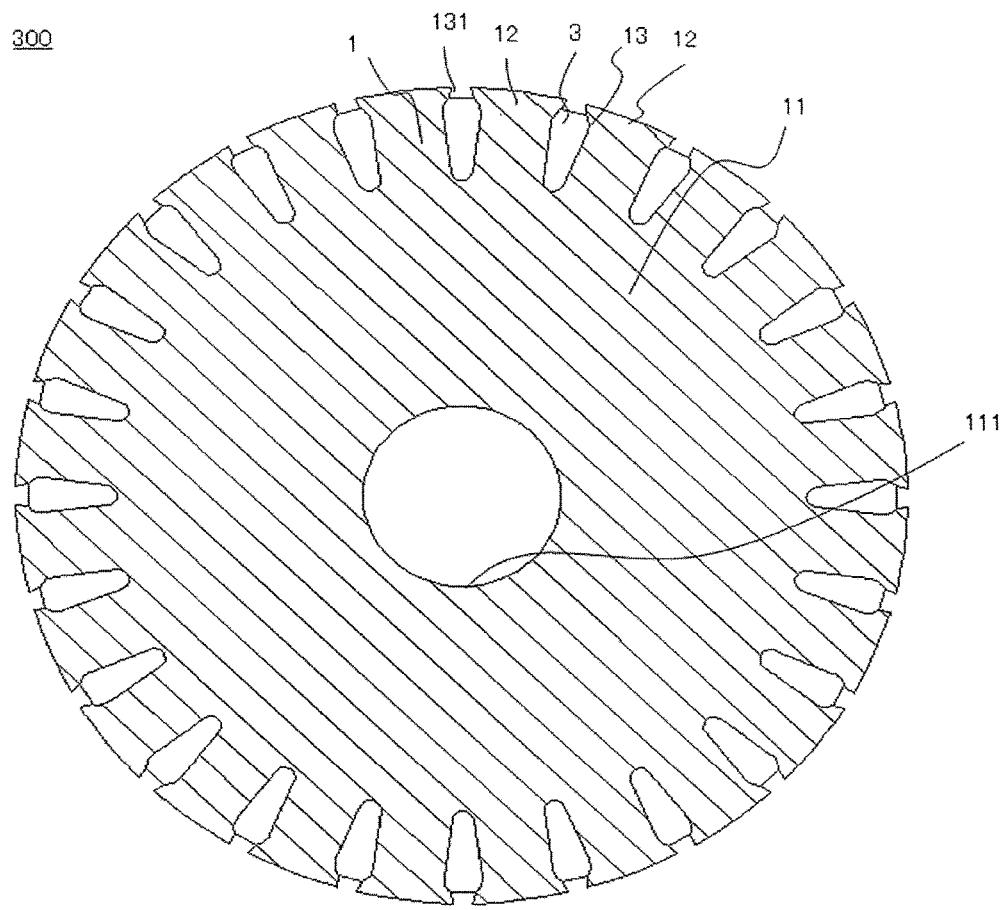
FIG. 6 is a cross-sectional view for illustrating the squirrel-cage rotor according to the first embodiment of the present invention.

FIG. 6 is a cross-sectional view for illustrating the squirrel-cage rotor according to this embodiment, specifically, FIG. 6 is a cross-sectional view for illustrating the squirrel-cage rotor 300 illustrated in FIG. 2.

Figure 7:
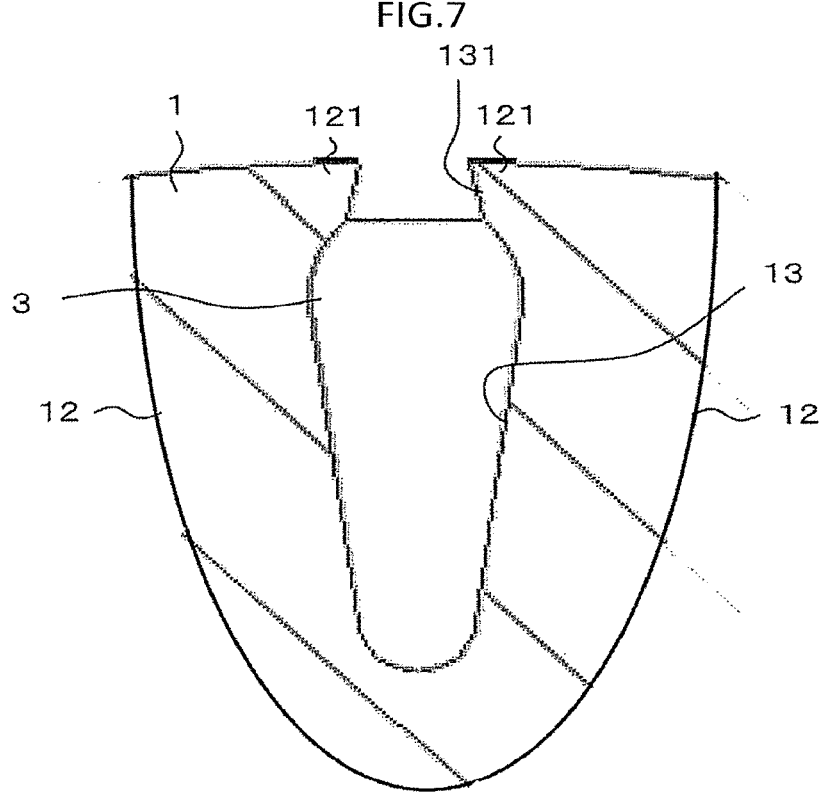
FIG. 7 is an enlarged view for illustrating a main part in FIG. 6.

FIG. 7 is an enlarged view for illustrating a main part in FIG. 6. FIG. 7 is a view of a main part of the squirrel-cage rotor 300 under a state in which the conductor 3 is arranged in the rotor slot 13 of FIG. 5 and the closing portion 2 is removed from the rotor core 1. After the conductor 3 is arranged in the rotor slot 13, the closing portion 2 is moved in the axial direction relative to the rotor core 1. With this, the closing portion 2 is removed from the rotor core 1. In FIG. 7, a surface 31 of the conductor 3 on the radially outer side is in an exposed state without contact with the rotor core 1.

Figure 8:
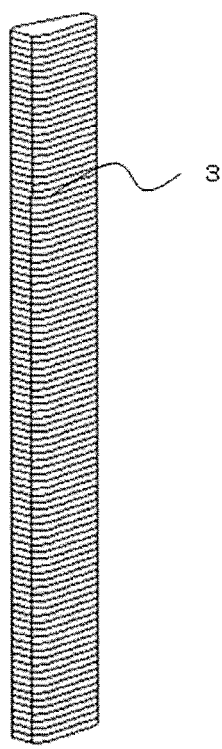
FIG. 8 is a perspective view for illustrating only a conductor of FIG. 7.

FIG. 8 is a perspective view for illustrating only the conductor of FIG. 7. A shape of the conductor 3 can be confirmed, for example, by cutting or fusing the rotor core 1.

Figure 9:
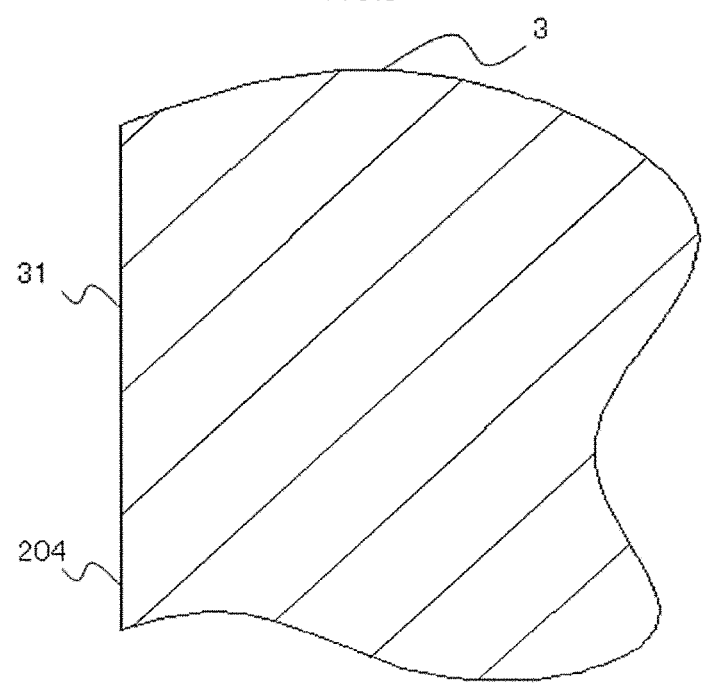
FIG. 9 is a view of a cross-section of the conductor taken along a plane including an axis and intersecting with a surface of the conductor, which is exposed on a radially outer side in FIG. 8, specifically, a part of a vicinity of the surface on the radially outer side.

FIG. 9 is a view of a cross-section of the conductor taken along a plane including the axis and intersecting with the surface of the conductor, which is exposed on the radially outer side in FIG. 8, specifically, a part of a vicinity of the surface on the radially outer side. When the liquefied conductor 3 is charged through die-casting into the rotor slot 13 that has been charged with the closing portion 2 formed by laminating the plurality of closing sheets in the axial direction, the conductor 3 is cured in conformity with a shape of a surface of the rotor core 1 formed by laminating the plurality of rotor core sheets, and a shape of a surface of the closing portion 2 formed by laminating the plurality of closing sheets. The conductor 3 partially enters spaces between lamination surfaces of the laminated closing sheets. The lamination surfaces of the laminated closing sheets correspond respectively to lamination surfaces of the plurality of rotor core sheets. Thus, on the surface 31 of the conductor 3 on the radially outer side, which is a part held in contact with the closing portion 2, projections are formed at positions along the lamination surfaces of the plurality of rotor core sheets. After that, the closing portion 2 is moved in the axial direction relative to the rotor core 1, and hence a part 204 corresponding to the surface 31 of the conductor 3 on the radially outer side is substantially linear.

Figure 10:
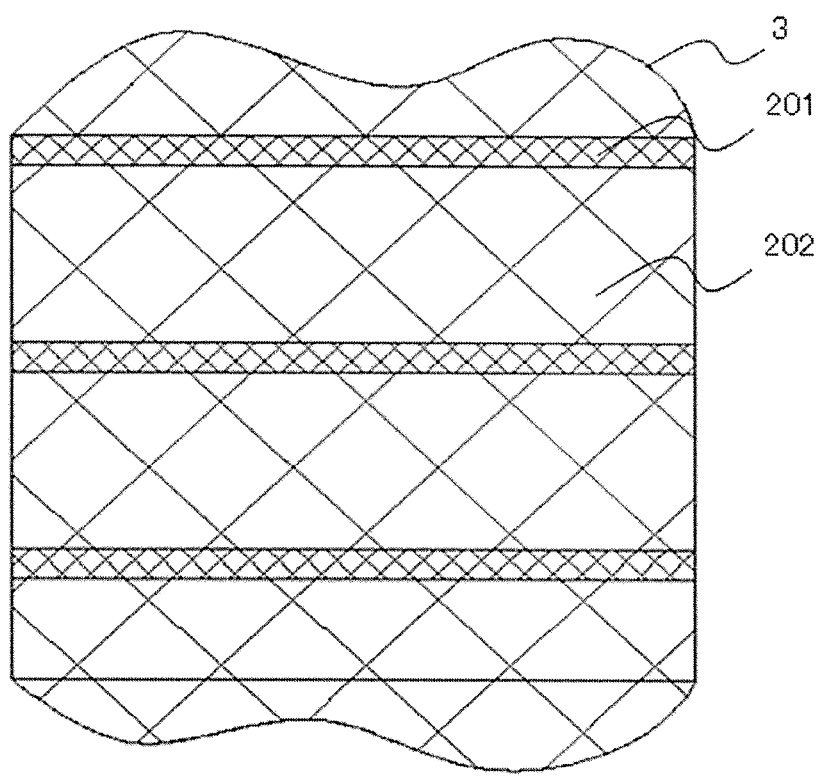
FIG. 10 is a view for illustrating a part of the surface of the conductor on the radially outer side in FIG. 8, which is viewed from the radially outer side.

FIG. 10 is a view for illustrating a part of the surface of the conductor on the radially outer side in FIG. 8, which is viewed from the radially outer side. The surface of the conductor 3, which is exposed on the radially outer side, has first surfaces 201 including the positions along the plurality of lamination surfaces of the rotor core 1, and second surfaces 202 different in surface roughness from the first surfaces 201. The first surfaces 201 are formed through abrasion of the projections as a result of the axial movement of the closing sheets forming the closing portion 2. The second surfaces 202 are formed in conformity with surfaces of the closing sheets, which protrude to the radially inner side (surfaces between the lamination surfaces of the closing sheets), and hence the second surfaces 202 are not abraded by the axial movement of the closing sheets. Thus, the surface roughness of the first surfaces 201 is higher than the surface roughness of the second surfaces 202. In this way, the surface roughness of the second surfaces 202 is different from the surface roughness of the first surfaces 201. Note that, the "surface roughness" refers to a ten-point average roughness or an arithmetic average roughness defined in Japanese Industrial Standards.

Note that, when the projections are plastically deformed as a result of the axial movement of the closing sheets, the surface roughness of the first surfaces 201 is lower than the surface roughness of the second surfaces 202. In this way, the surface roughness of the second surfaces 202 is different from the surface roughness of the first surfaces 201. With this, a risk in that foreign objects generated as a result of chipping of the surface 31 of the conductor 3 on the radially outer side through the die-casting are entrapped in the rotary electric machine 500 during rotation of the squirrel-cage rotor 300 can be reduced to be lower than that in a case where the surface 31 of the conductor 3 on the radially outer side remains as a cast surface of a die-casting. Therefore, the rotary electric machine 500 can be stably operated.

Further, through die-casting, the liquefied conductor 3 is cured in conformity with the shape of the surface of the closing portion 2, and hence the conductor 3 after the die-casting is held in abutment against the closing portion 2. In addition, a yield stress of the conductor 3 is lower than a yield stress of the closing portion 2. Thus, when the closing portion 2 continues to be moved in the axial direction under a state in which a stress is applied between the closing portion 2 and the conductor 3, the conductor 3 is deformed by the closing portion 2. When the closing portion 2 is removed from the rotor core 1 by being moved in the axial direction, grooves are formed substantially in the axial direction along the conductor 3 by the deformation along with the movement of the closing portion 2. Thus, when the closing portion 2 is removed from the rotor core 1 by being moved in the axial direction, the grooves are formed substantially in the axial direction along the conductor 3. With this, a contact area between the conductor 3 and the air is increased to be larger than a contact area between the air and a conductor without the grooves. Therefore, when the heat generated by the conductors 3 is radiated into the air by rotating the squirrel-cage rotor 300 that is assembled in the rotary electric machine 500, the heat radiation amount can be more secured as compared to the case where the grooves are not formed.

As described above, in the squirrel-cage rotor manufacturing method according to the first embodiment of the present invention, die-casting is performed under the state in which the radially outer parts of the rotor slots 13 are closed with the closing portions 2 made of the same material as that of the rotor core 1. Thus, the linear expansion coefficients of the closing portions 2 and the rotor core 1 are equal to each other. As a result, at the time of performing the die-casting, formation of the gaps between the closing portions 2 and the rotor core 1 at the radially outer parts of the rotor slots 13, or reduction in cross-sectional area of the conductors 3 as a result of expansion of the closing portions 2 can be suppressed.

Further, the closing portions 2, which are formed by laminating the closing sheets corresponding respectively to the rotor core sheets formed through punching of the same steel sheet material that is subjected to punching for obtaining the closing sheets, are charged in the rotor slot openings 131. With this configuration, the dimensions of the shape of the part corresponding to each of the rotor slot openings 131 of each of the rotor core sheets, and the dimensions of the shape of the corresponding closing sheet are set equal to each other. Therefore, the influence of the dimensional tolerance between the rotor core 1 and the closing portions 2 is eliminated at the rotor slot openings 131. With this, the conductors 3 can be arranged in the rotor slots 13 without leakage of the liquefied conductors 3 through the rotor slot openings 131.

Further, the closing portions 2 are formed of the parts of the steel sheets cut off from the rotor core 1 at the time of forming the rotor core 1 through punching of the steel sheets with the die sets. Thus, the rotor core 1 as well as the closing portions 2 can be formed.

The closing portions 2 are each formed so as to be reduced in circumferential width from the radially inner side toward the radially outer side. Thus, at the time of performing die-casting, the closing portions 2 can be restricted from being moved to the radially outer side.

Further, in the rotor core with closing portions for a squirrel-cage rotor and the squirrel-cage rotor 300 according to the first embodiment of the present invention, the rotor core 1 having the rotor slots 13 formed along the radially outer part thereof, and the closing portions 2 made of the same material as that of the rotor core 1 and configured to close the radially outer parts of the rotor slots 13 are arranged. With this, at the time of performing die-casting, formation of the gaps between the closing portions 2 and the rotor core 1 at the radially outer parts of the rotor slots 13, or reduction in cross-sectional area of the conductors 3 as a result of the expansion of the closing portions 2 is suppressed.

Further, in the squirrel-cage rotor 300 according to this embodiment, the surface 31 of each of the conductors 3, which is exposed on the radially outer side, has the first surfaces 201 including the positions along the plurality of lamination surfaces of the rotor core 1, and the second surfaces 202 different in surface roughness from the first surfaces 201. Thus, the part 204 corresponding to the surface 31 of each of the conductors 3 on the radially outer side is substantially linear. With this, the risk in that the foreign objects generated as a result of chipping of the surface 31 of each of the conductors 3 on the radially outer side through the die-casting are entrapped in the rotary electric machine 500 during the rotation of the squirrel-cage rotor 300 can be reduced to be lower than that in the case where the surface 31 of each of the conductors 3 on the radially outer side remains as the cast surface of a die-casting. Therefore, the rotary electric machine 500 can be stably operated.

Note that, in the configuration described above in the first embodiment, the rotor core 1 has the twenty-four rotor slots 13, but the number of the rotor slots 13 is not limited to twenty four as long as the rotor core 1 has a plurality of rotor slots 13.

Further, in the configuration described above in the first embodiment, the closing portions 2 are each formed so as to be reduced in circumferential width from the radially inner side toward the radially outer side. However, the shape of the closing portions 2 is not limited thereto as long as the closing portions 2 are each formed into such a shape as not to form gaps between the closing portions 2 and the rotor teeth 12 in the circumferential direction.

Still further, in the first embodiment, the closing portion 2 need not necessarily be arranged entirely in a radial range in the rotor slot opening 131 as in FIG. 5 as long as the closing portion 2 is arranged on the radially outer side with respect to the conductor 3. Specifically, the closing portion 2 may be arranged in a part of the radial range in the rotor slot opening 131. Further, the closing portion 2 may protrude to the radially inner side with respect to the radial range in the rotor slot opening 131, or may be arranged only on the radially inner side with respect to the radial range in the rotor slot opening 131.

Yet further, the electromagnetic steel sheet is employed as the materials of the rotor core 1 and the closing portions 2 described above in the first embodiment. However, the materials of the rotor core 1 and the closing portions 2 are not limited thereto, and may be a thin steel sheet of any type, such as a cold-rolled steel sheet SPCC.

Second Embodiment

Figure 11:
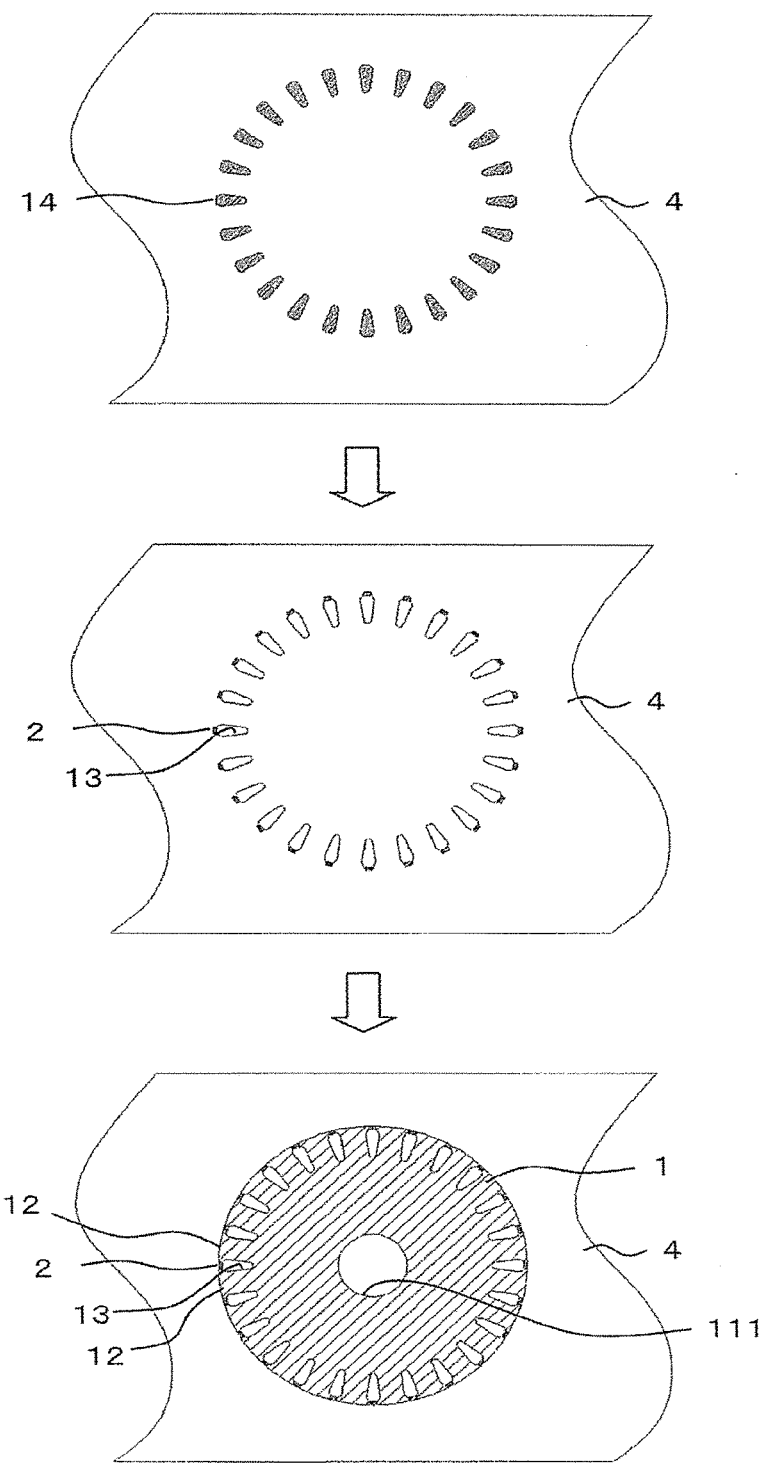
FIG. 11 is an explanatory view for illustrating a squirrel-cage rotor manufacturing method according to a second embodiment of the present invention.

FIG. 11 is an explanatory view for illustrating a squirrel-cage rotor manufacturing method according to a second embodiment of the present invention. Description is made of a procedure for manufacturing the rotor core with closing portions for a squirrel-cage rotor. First, a steel sheet 4 is punched with a die set (not shown) so as to form through-holes 14 to be charged with the conductors 3 (FIG. 7). Then, the steel sheet 4 is punched with a die set (not shown) so as to form the closing portions 2 that are parts of the steel sheet 4 to be cut off from the steel sheet 4 to be formed into the rotor core 1. Next, the closing portions 2 thus formed are arranged at original positions in the rotor core 1. After that, the steel sheet 4 is punched with a die set (not shown) so as to form an outer shape of the rotor core 1. Other configurations are the same as those in the first embodiment.

Figure 12:
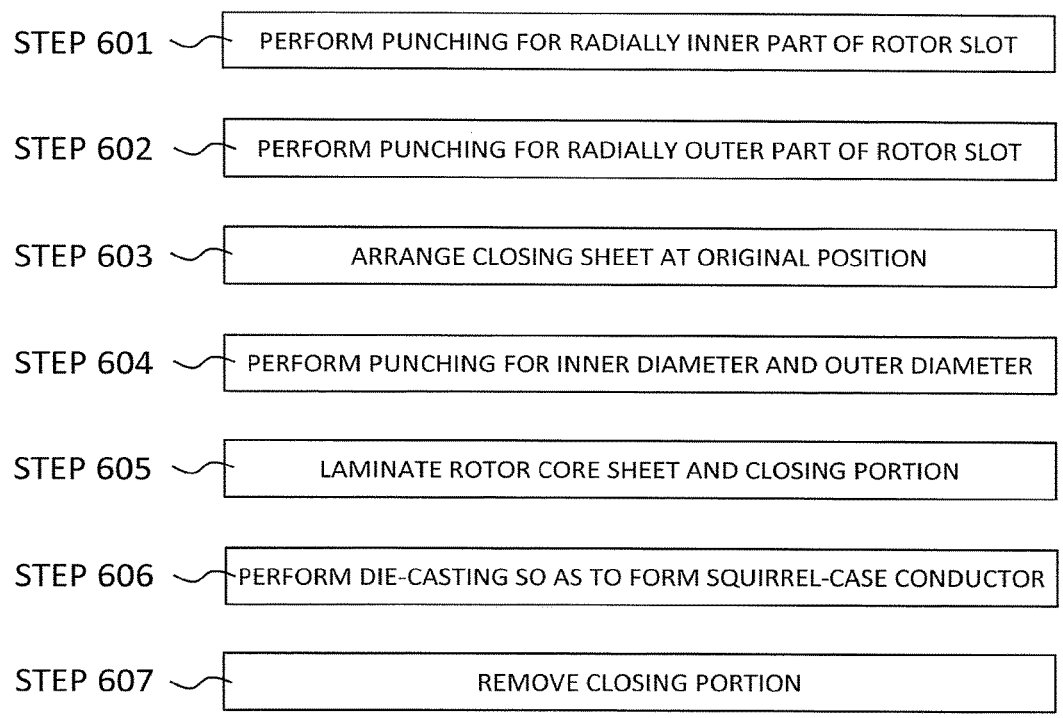
FIG. 12 is a flowchart for illustrating the squirrel-cage rotor manufacturing method according to the second embodiment of the present invention.

FIG. 12 is a flowchart for illustrating the squirrel-cage rotor manufacturing method according to this embodiment. With reference to FIG. 12, detailed description is made of the manufacturing method for the rotor core 1 described above. First, in Step 601, the steel sheet 4 is punched with a die set so that the through-holes 14 are formed correspondingly to the radially inner parts in the rotor slots 13. Then, in Step 602, the steel sheet 4 is punched with a die set so that the closing sheets to form the closing portions 2 are formed on the steel sheet 4 correspondingly to the radially outer parts in the rotor slots 13. Next, in Step 603, the closing sheets cut off from the steel sheet 4 are arranged at the original positions in the rotor core sheet of the steel sheet 4, specifically, at the radially outer parts in the rotor slots 13. After that, in Step 604, the steel sheet 4 is punched with a die set so that an inner diameter and an outer diameter, which form the outer shape of the rotor core 1, are sequentially formed. In this way, the rotor core sheet and the closing sheets are formed through punching. Step 601 to Step 604 correspond to a step of forming the rotor core sheets through punching with the die sets.

Then, in Step 605, the plurality of rotor core sheets and the closing sheets formed through punching in Step 604 are laminated in the axial direction. Next, laminated rotor core sheets and laminated closing sheets are each fixed in the axial direction, for example, through bonding, welding, or caulking, and are coupled to each other in the axial direction. In this way, the rotor core with closing portions for a squirrel-cage rotor is manufactured. In this case, the rotor core sheets and the closing sheets formed through punching of the same steel sheet 4 are laminated correspondingly to each other.

Then, in Step 606, through die-casting, the liquefied conductors 3 are charged into the rotor slots 13 of the rotor core with closing portions for a squirrel-cage rotor. Further, through the die-casting, the end rings 200 are formed on both the axial end surfaces of the rotor core 1, and the end rings 200 are short-circuited at both the axial ends of the conductors 3. With this, the squirrel-cage conductor 250 including the conductors 3 and the end rings 200 is formed in the rotor core with closing portions for a squirrel-cage rotor.

Next, in Step 607, the closing portions 2 are moved in the axial direction so as to be removed from the rotor core with closing portions for a squirrel-cage rotor in which the squirrel-cage conductor 250 is formed. With this, the squirrel-cage rotor 300 is manufactured.

Note that, Step 601 and Step 602 may be reversely performed. However, when the through-holes 14 are formed correspondingly to the radially inner parts in the rotor slots 13 in Step 601, and then punching is performed correspondingly to the radially outer parts in the rotor slots 13 so as to form the closing sheets in Step 602, deformation of the closing sheets as a result of the punching can be minimized. Thus, as illustrated in FIG. 12, it is desired that Step 601 be performed prior to Step 602.

As described above, in the squirrel-cage rotor manufacturing method according to the second embodiment of the present invention, the rotor core 1 and the closing portions 2 are formed with the die sets. Thus, the rotor core 1 and the closing portions 2 can be easily formed.

Third Embodiment

Figure 13:
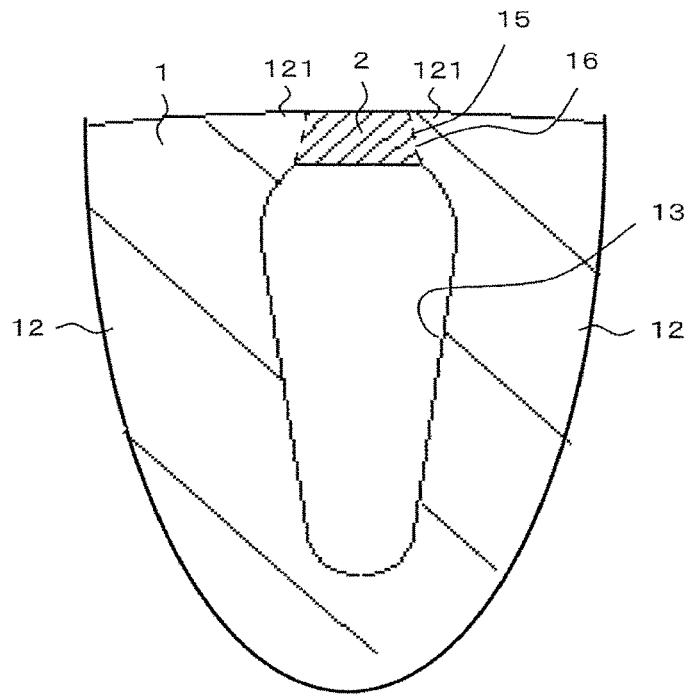
FIG. 13 is an enlarged view for illustrating a main part of a rotor core with closing portions for a squirrel-cage rotor according to a third embodiment of the present invention.

FIG. 13 is an enlarged view for illustrating a main part of a rotor core with closing portions for a squirrel-cage rotor according to a third embodiment of the present invention. In the configurations described above in the first embodiment and the second embodiment, the closing portion 2 is cut out from the rotor core 1, and then arranged in the rotor slot opening 131. However, in the third embodiment, the closing portion 2 is formed under a state of being connected to the rotor core 1. Specifically, slit portions 15 are formed between the closing portion 2 and the rotor core 1. In other words, the closing portion 2 and the rotor core 1 are connected to each other through intermediation of coupling portions 16. In FIG. 13, the perforated slit portions 15 are formed between the closing portion 2 and the rotor core 1. In other words, the plurality of coupling portions 16 are formed between the closing portion 2 and the rotor core 1. This configuration can be achieved by using such a die set as to punch the steel sheet 4 while maintaining the closing portion 2 and parts of the rotor core 1 to be connected to each other. Other configurations are the same as those in the first embodiment.

At the time of performing die-casting, the liquefied conductor is poured into the rotor slot 13 through the axial end portion of the rotor core 1. Even when the high-pressure conductor is charged into the rotor slot 13, the rotor core 1 and the closing portion 2 are coupled to each other with the coupling portions 16, and hence the closing portion 2 is restricted from being moved to the radially outer side. After the conductor 3 is arranged in the rotor slot 13, the closing portion 2 is pressed in the axial direction with a force having such a magnitude as to cut the coupling portions 16. With this, the closing portion 2 and the rotor core 1 are disconnected from each other, and the closing portion 2 is moved in the axial direction. In this way, the closing portion 2 is removed from the rotor core 1.

Figure 14:
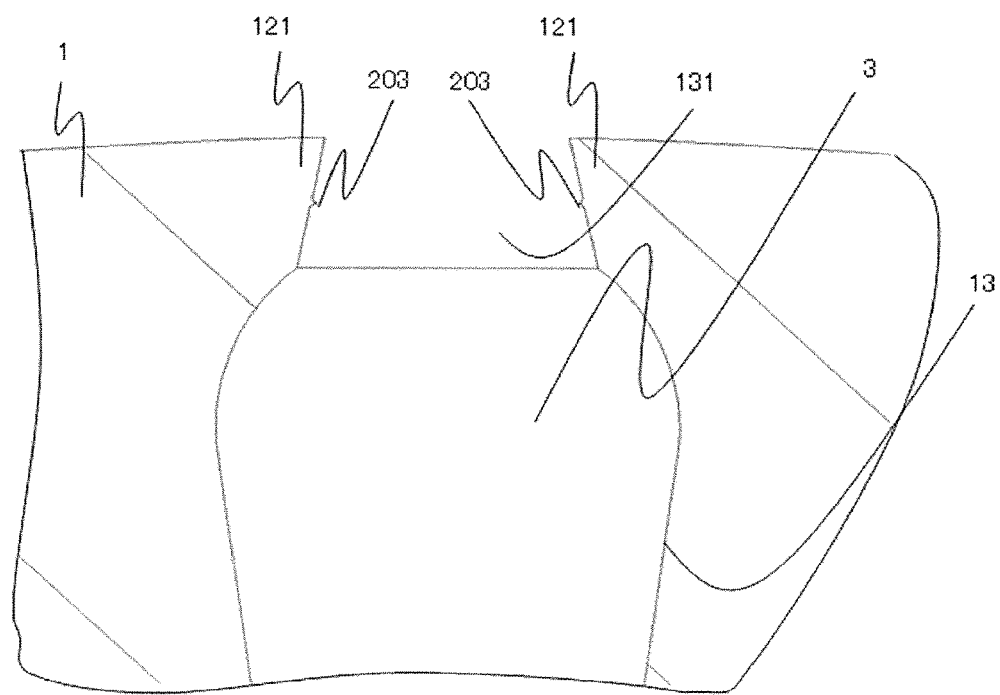
FIG. 14 is an enlarged view for illustrating a main part of a squirrel-cage rotor according to the third embodiment of the present invention.

FIG. 14 is an enlarged view for illustrating a main part of a squirrel-cage rotor according to this embodiment. As illustrated in FIG. 14, the squirrel-cage rotor according to this embodiment is obtained by removing the closing portion 2 after the squirrel-cage conductor 250 is formed in the rotor core with closing portions for a squirrel-cage rotor of FIG. 13. When removing the closing portion 2 from the rotor core 1, the closing portion 2 is moved in the axial direction. With this, a tensile stress is generated substantially in the axial direction at the coupling portions 16 between the closing portion 2 and the rotor core 1. Thus, the closing portion 2 is plastically deformed before being removed. As a result, after the closing portion 2 is removed from the rotor core 1, projections 203 are formed through the plastic deformation at parts where the coupling portions 16 in the rotor slot opening 131 have been arranged. Note that, the coupling portions 16 are not limited to be arranged in the rotor slot opening 131 as long as the coupling portions 16 are located on the radially outer side with respect to the conductor 3 in the rotor slot 13. In other words, the surface of the rotor core 1, which forms the rotor slot 13, has the projections 203 formed on the radially outer side with respect to the conductor 3.

In the first embodiment, at the time of performing die-casting, the die set (not shown) is arranged on the radially outer side of the closing portion 2 so as not to move the closing portion 2 to the radially outer side. In addition, the closing portion 2 is pressed to the radially inner side with this die set so as to prevent the liquefied conductor from flowing into the rotor slot opening 131. Meanwhile, in the third embodiment, the rotor core 1 and the closing portion 2 are connected to each other with the coupling portions 16. Thus, at the time of performing die-casting, the closing portion 2 can be restricted from being moved to the radially outer side without using the die set. As a result, the liquefied conductor can be easily prevented from flowing into the rotor slot opening 131.

As described above, in the squirrel-cage rotor manufacturing method according to the third embodiment of the present invention, at the time of forming the rotor core 1 through punching of the steel sheet 4 with a die set, the closing portion 2 is formed under the state of being connected to the rotor core 1. Thus, at the time of performing die-casting, the closing portion 2 can be restricted from being moved to the radially outer side.

Further, in the squirrel-cage rotor 300 according to this embodiment, when the closing portion 2 is removed from the rotor core 1, on the surface of the rotor core 1, which forms the rotor slot 13, the projections 203 are formed on the radially outer side with respect to the conductor 3. With this, permeance, that is, flowability of magnetic flux, can be enhanced on the radially outer side with respect to the conductor 3 in the rotor slot 13. Thus, in harmonic magnetic flux generated when the rotary electric machine 500 is driven, a magnitude of magnetic flux interlinked with the conductor 3 is reduced. With this, loss in the rotary electric machine 500 can be reduced.

Note that, in the configuration described above in the third embodiment, the perforated slit portions 15 are formed between the closing portion 2 and the rotor core 1. However, in order to prevent leakage of the liquefied conductor, the perforated slit portions 15 need not necessarily be formed between the closing portion 2 and the rotor core 1 as long as the closing portion 2 is connected to the parts of the rotor core 1 with the coupling portions 16.

Further, in the configuration described above in the third embodiment, the closing portion 2 is formed so as to be reduced in circumferential width from the radially inner side toward the radially outer side. However, the shape of the closing portion 2 is not limited thereto as long as the closing portion 2 is formed into such a shape as not to form the gaps between the closing portion 2 and the rotor teeth 12 in the circumferential direction.

Fourth Embodiment

Figure 15:
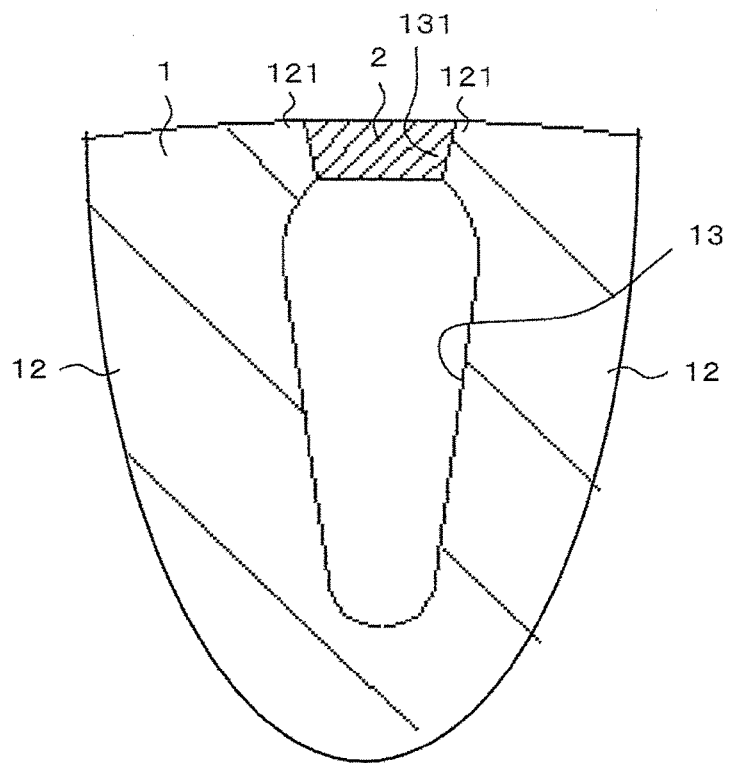
FIG. 15 is an enlarged view for illustrating a main part of a rotor core with closing portions for a squirrel-cage rotor according to a fourth embodiment of the present invention.

FIG. 15 is an enlarged view for illustrating a main part of a rotor core with closing portions for a squirrel-cage rotor according to a fourth embodiment of the present invention. In the configurations described above in the first embodiment to the third embodiment, the closing portion 2 is formed so as to be reduced in circumferential width from the radially inner side toward the radially outer side. However, the closing portion 2 need not necessarily have such a configuration as long as, even when the radially outward force generated by the liquefied conductor is applied to the closing portion 2, the closing portion 2 is not moved to the radially outer side due to contact between the closing portion 2 and the flange portions 121 in the circumferential direction.

In the fourth embodiment, the closing portion 2 is formed so as to be increased in circumferential width from the radially inner side toward the radially outer side. The flange portions 121 are each formed so that the protruding amount thereof becomes smaller from the radially inner side toward the radially outer side in conformity with the shape of the closing portion 2. At the time of performing die-casting, the closing portion 2 is restricted from being moved to the radially outer side with the die set.

Figure 16:
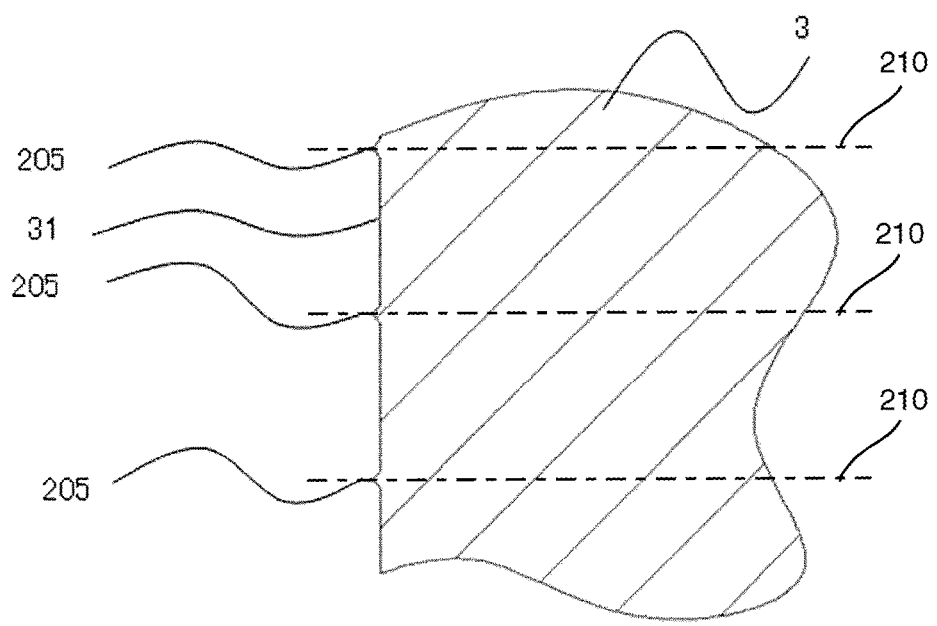
FIG. 16 is a view of a cross-section of the conductor taken along the plane including the axis and intersecting with the surface of the conductor, which is exposed on the radially outer side, specifically, apart of the vicinity of the surface on the radially outer side in a squirrel-cage rotor according to the fourth embodiment of the present invention.

FIG. 16 is a view of a cross-section of the conductor taken along the plane including the axis and intersecting with the surface of the conductor, which is exposed on the radially outer side, specifically, a part of the vicinity of the surface on the radially outer side in the squirrel-cage rotor according to this embodiment. As in the first embodiment, when the liquefied conductor 3 is charged through die-casting into the rotor slot 13 that has been charged with the closing portion 2 formed by laminating the plurality of closing sheets in the axial direction, the conductor 3 is cured in conformity with the shape of the surface of the rotor core 1 formed by laminating the plurality of rotor core sheets, and the shape of the surface of the closing portion 2 formed by laminating the plurality of closing sheets. The conductor 3 partially enters spaces between the lamination surfaces 210 of the laminated closing sheets. The lamination surfaces 210 of the laminated closing sheets correspond respectively to the lamination surfaces 210 of the plurality of rotor core sheets. Thus, on the surface 31 of the conductor 3 on the radially outer side, which is a part held in contact with the closing portion 2, projections 205 are formed at the positions along the lamination surfaces 210 of the plurality of rotor core sheets. After that, unlike the first embodiment, the closing portion 2 is moved to the radially outer side relative to the rotor core 1. In this way, the surface 31 of the conductor 3, which is exposed on the radially outer side, has the projections 205 formed at the positions along the lamination surfaces 210 of the plurality of rotor core sheets. Therefore, the part corresponding to the surface 31 of the conductor 3 on the radially outer side is not linear. Other configurations are the same as those in the first embodiment.

In the first embodiment, in order to remove the closing portion 2 from the rotor core 1, the closing portion 2 needs to be pressed in the axial direction with a force larger than a resultant force of a frictional force between the rotor core 1 and the closing portion 2, and a frictional force between the closing portion 2 and the conductor 3. Meanwhile, in the fourth embodiment, in order to remove the closing portion 2 from the rotor core 1, the closing portion 2 is pressed to the radially outer side with a force larger than the frictional force between the rotor core 1 and the closing portion 2. In this way, the closing portion 2 can be removed from the rotor core 1 with a force smaller than that in the case of the first embodiment.

As described above, in the squirrel-cage rotor manufacturing method according to the fourth embodiment of the present invention, the closing portion 2 is formed so as to be increased in circumferential width from the radially inner side toward the radially outer side. Thus, the closing portion 2 can be easily removed from the rotor core 1 by pressing the closing portion 2 to the radially outer side.

Further, in the squirrel-cage rotor 300 according to this embodiment, the surface 31 of the conductor 3, which is exposed on the radially outer side, has the projections 205 formed at the positions along the lamination surfaces of the plurality of rotor core sheets. In addition, the contact area between the conductor 3 and the air is larger than the contact area between the air and a conductor without the projections 205. Further, the projections 205 are formed on an outer periphery of the squirrel-cage rotor 300. Therefore, when the heat generated by the conductor 3 is radiated into the air by rotating the squirrel-cage rotor 300 that is assembled in the rotary electric machine 500, the heat radiation amount can be more secured as compared to the case where the projections 205 are not formed.

Note that, in the configuration described above in the fourth embodiment, the closing portion 2 is formed so as to be increased in circumferential width from the radially inner side toward the radially outer side, but the shape of the closing portion 2 is not limited thereto. The closing portion 2 may be formed so as not to vary in circumferential width from the radially inner side toward the radially outer side, that is, the closing portion 2 may be formed so as to be uniform in circumferential width from the radially inner side toward the radially outer side.

Fifth Embodiment

FIG. 17 is an enlarged view for illustrating a main part of a rotor core with closing portions for a squirrel-cage rotor according to a fifth embodiment of the present invention. In the configurations described above in the first embodiment to the fourth embodiment, the plurality of closing sheets of the closing portion 2 are laminated but not coupled to each other. In the fifth embodiment, however, the plurality of closing sheets of the closing portion 2 are laminated and coupled to each other with a single caulking portion 17. The caulking portion 17 is arranged at a central part of the closing portion 2. Other configurations are the same as those in the first embodiment.

At the time of removing the closing portion 2 from the rotor core 1, as in the first embodiment to the third embodiment, the closing portion 2 is pressed in the axial direction after the conductor 3 is arranged in the rotor slot 13 through die-casting. With this, the closing portion 2 is removed from the rotor core 1. In this case, the plurality of closing sheets laminated in the axial direction are coupled to each other, and hence the closing portion 2 can be easily removed from the rotor core 1.

Meanwhile, when the plurality of closing sheets are not fastened to each other, in order to prevent scattering of the steel sheets 4 forming the rotor core 1, for example, it is conceivable to form caulking portions in the rotor teeth 12. However, in this case, in the rotor teeth 12, magnetic flux is unlikely to pass through parts at which the caulking portions are formed. In addition, a stress is applied to the rotor teeth 12 at the time of caulking. Thus, magnetic characteristics of the rotor teeth 12 are deteriorated. Meanwhile, in the fifth embodiment, the plurality of closing sheets are fastened to each other, and hence the caulking portions need not be formed in the rotor teeth 12. Thus, the magnetic flux easily passes through the rotor teeth 12, and hence deterioration in torque characteristic of the rotary electric machine can be suppressed.

As described above, in the squirrel-cage rotor manufacturing method according to the fifth embodiment of the present invention, the closing portion 2 is formed of the plurality of closing sheets laminated in the axial direction, and die-casting is performed under the state in which the plurality of closing sheets laminated in the axial direction are coupled to each other. Thus, the closing portion 2 can be easily removed from the rotor core 1. Further, the caulking portions need not be formed in the rotor teeth 12, and hence deterioration in torque characteristic of the rotary electric machine can be suppressed.

Note that, in the configuration described above in the fifth embodiment, the caulking portion 17 is arranged at the central part of the closing portion 2, but the arrangement of the caulking portion 17 is not limited thereto. The caulking portion 17 may be arranged at any part in the closing portion 2.

Further, in the configuration described above in the fifth embodiment, the single caulking portion 17 is arranged, but the number of caulking portions 17 is not limited to one. A plurality of caulking portions 17 may be arranged.

Sixth Embodiment

FIG. 18 is an enlarged view for illustrating a main part of a rotor core with closing portions for a squirrel-cage rotor according to a sixth embodiment of the present invention. In the configurations described above in the first embodiment to the fifth embodiment, the closing portion 2 is arranged only in the rotor slot opening 131. In contrast, in the sixth embodiment, the closing portion 2 is arranged also in a region other than the rotor slot opening 131. Specifically, the closing portion 2 is formed into such a T-shape as to include a wide portion 21 having a circumferential width larger than a circumferential width of the radially outer part of the rotor slot 13. The wide portion 21 is held in surface contact with the outer peripheral surface of the rotor core 1 from the radially outer side. Die-casting is performed under the state in which the wide portion 21 is held in surface contact with the outer peripheral surface of the rotor core 1 from the radially outer side. Other configurations are the same as those in the first embodiment.

In the first, second, third, and fifth embodiments, the closing portion 2 is removed from the rotor core 1 by pressing the closing portion 2 in the axial direction. Meanwhile, in the sixth embodiment, as in the fourth embodiment, the closing portion 2 is removed from the rotor core 1 by moving the closing portion 2 to the radially outer side. In the fourth embodiment, the closing portion 2 can be removed from the rotor core 1 with a force smaller than those in the first, second, third, and fifth embodiments. However, at the time of performing die-casting, the closing portion 2 may be moved to the radially outer side by being unable to bear the pressure of the conductor when the liquefied conductor is charged into the rotor slot 13. When the closing portion 2 is moved to the radially outer side, the gap is formed between the rotor core 1 and the closing portion 2. As a result, the liquefied conductor leaks into the gaps. Meanwhile, in the sixth embodiment, the closing portion 2 is formed into such a T-shape as to have the circumferential width of the wide portion 21 larger than the circumferential width of the rotor slot opening 131. Thus, the closing portion 2 can be brought into abutment against the die set (not shown) for die-casting over a contact area larger than that in the fourth embodiment. With this, the closing portion 2 can be pressed to the radially inner side so that the closing portion 2 is not moved to the radially outer side by the pressure of the conductor at the time of performing die-casting.

As described above, in the squirrel-cage rotor manufacturing method according to the sixth embodiment of the present invention, the closing portion 2 includes the wide portion 21 having the circumferential width larger than the circumferential width of the radially outer part of the rotor slot 13, and die-casting is performed under the state in which the wide portion 21 is held in surface contact with the outer peripheral surface of the rotor core 1 from the radially outer side. Thus, the contact area between the closing portion 2 and the die set arranged on the radially outer side with respect to the rotor core 1 and configured to restrict the closing portion 2 from being moved to the radially outer side can be increased. As a result, formation of the gap between the rotor core 1 and the closing portion 2 can be further prevented, and the desired cross-sectional shape of the conductor 3 can be obtained.

Figure 19:
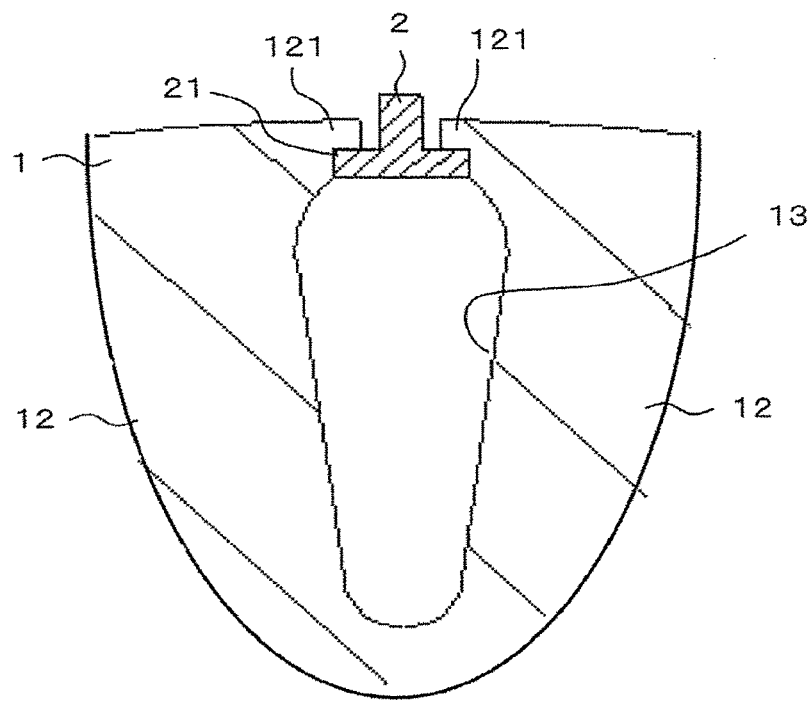
FIG. 19 is an enlarged view for illustrating a modification of the rotor core with closing portions for a squirrel-cage rotor of FIG. 18.

Note that, in the configuration described above in the sixth embodiment, the closing portion 2 is formed into the T-shape, but the shape of the closing portion 2 is not limited to the T-shape as long as the closing portion 2 includes the wide portion 21 having the circumferential width larger than the circumferential width of the rotor slot opening 131. Thus, as illustrated in FIG. 19, the closing portion 2 may be formed into an inverted T-shape. In this case, the wide portion 21 is arranged on the radially inner side with respect to the flange portions 121.

Seventh Embodiment

Figure 20:
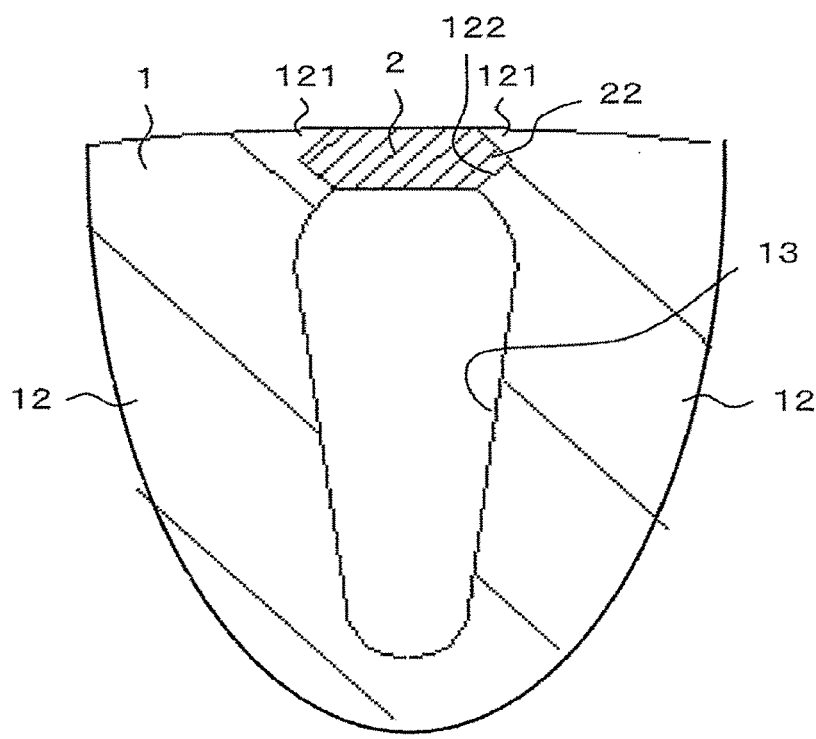
FIG. 20 is an enlarged view for illustrating a main part of a rotor core with closing portions for a squirrel-cage rotor according to a seventh embodiment of the present invention.

FIG. 20 is an enlarged view for illustrating a main part of a rotor core with closing portions for a squirrel-cage rotor according to a seventh embodiment of the present invention. In the configurations described in the first embodiment to the fifth embodiment, the closing portion 2 is formed so as to be increased in circumferential width from the radially inner side toward the radially outer side, or the closing portion 2 is formed so as to be reduced in circumferential width from the radially inner side toward the radially outer side. Meanwhile, in the seventh embodiment, the closing portion 2 includes protruding portions 22 formed so as to protrude to the circumferentially outer side. The flange portions 121 include recessed portions 122 formed in conformity with a shape of the protruding portions 22.

In other words, the closing portion 2 is formed so as to be increased in circumferential width from the radially inner side toward a radially intermediate portion, and reduced in circumferential width from the radially intermediate portion toward the radially outer side. Other configurations are the same as those in the first embodiment.

In order to remove the closing portion 2 from the rotor core 1, the closing portion 2 is pressed in the axial direction as in the first, second, third, and fifth embodiments.

As described above, in the squirrel-cage rotor manufacturing method according to the seventh embodiment of the present invention, the closing portion 2 includes the protruding portions 22 formed so as to protrude to the circumferentially outer side. With this, even when the liquefied conductor under the high pressure flows into the rotor slot 13 through die-casting, the closing portion 2 is restricted from being moved to the radially outer side. Further, when the die set (not shown) for die-casting is brought into abutment against the closing portion 2 from the radially outer side so as to restrict the closing portion 2 from being moved to the radially outer side, the closing portion 2 is restricted from being moved to the radially inner side. As a result, the closing portion 2 can be restricted from being moved in the radial direction, and the desired cross-sectional shape of the conductor 3 can be obtained.

Figure 21:
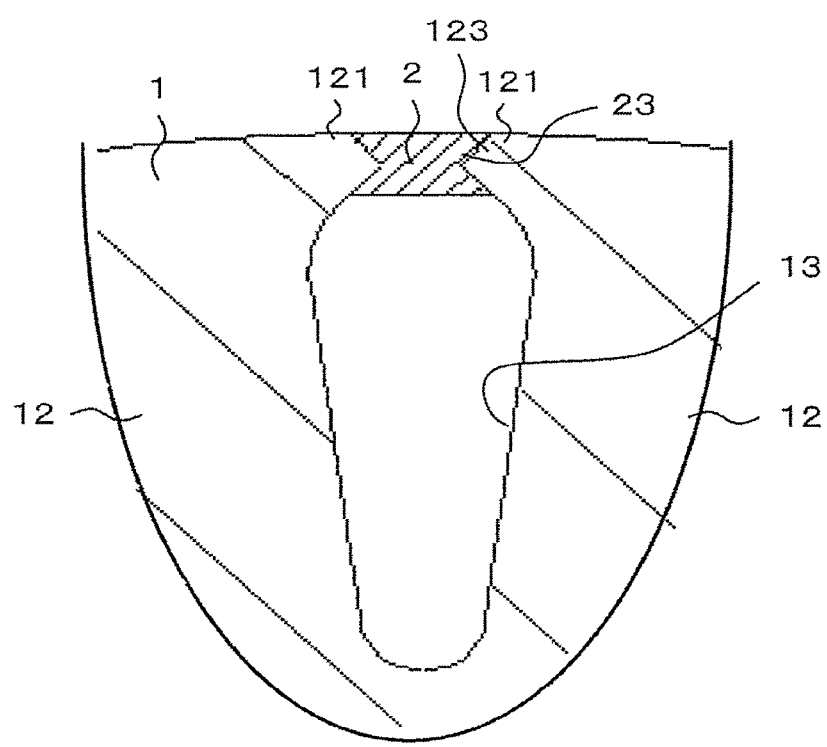
FIG. 21 is an enlarged view for illustrating a modification of the rotor core with closing portions for a squirrel-cage rotor of FIG. 20.

Note that, in the configuration described above in the seventh embodiment, the closing portion 2 includes the protruding portions 22 formed so as to protrude to the circumferentially outer side, but the closing portion 2 is not limited thereto. For example, as illustrated in FIG. 21, the closing portion 2 may include recessed portions 23 formed to be recessed to a circumferentially inner side. In other words, the closing portion 2 may be formed so as to be reduced in circumferential width from the radially inner side toward the radially intermediate portion, and increased in circumferential direction from the radially intermediate portion toward the radially outer side. In this case, the flange portions 121 include protruding portions 123 formed in conformity with a shape of the recessed portions 23.

Figure 22:
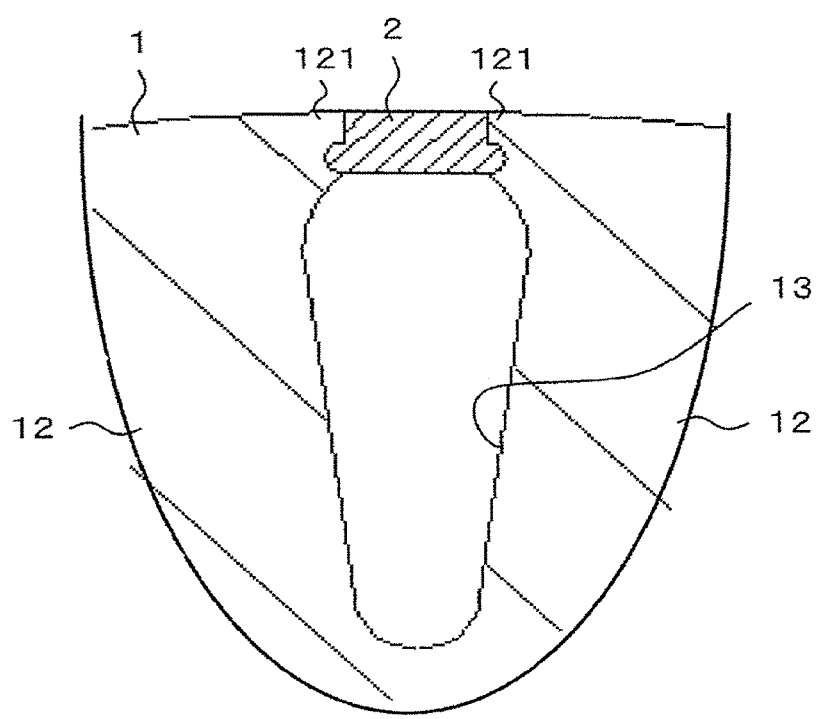
FIG. 22 is an enlarged view for illustrating a modification of the rotor core with closing portions for a squirrel-cage rotor of FIG. 20.

Further, in the configuration described above in the seventh embodiment, the closing portion 2 is formed so as to be increased in circumferential width from the radially inner side toward the radially intermediate portion, and reduced in circumferential direction from the radially intermediate portion toward the radially outer side. However, the shape of the closing portion 2 is not limited thereto. For example, as illustrated in FIG. 22, the closing portion 2 may be formed so as to be once increased, then reduced, and then uniform in circumferential width from the radially inner side toward the radially outer side. In this case, the flange portions 121 are formed in conformity with the shape of the closing portion 2.

Note that, as a matter of course, the squirrel-cage rotors 300 according to the first, third, and fourth embodiments can be manufactured through the manufacturing method for the squirrel-cage rotor 300 according to the second embodiment by using the rotor cores with closing portions for a squirrel-cage rotor according to the fifth embodiment to the seventh embodiment. Further, those squirrel-cage rotors 300 each have the effects described respectively in the fifth embodiment to the seventh embodiment.

Eighth Embodiment

Figure 23:
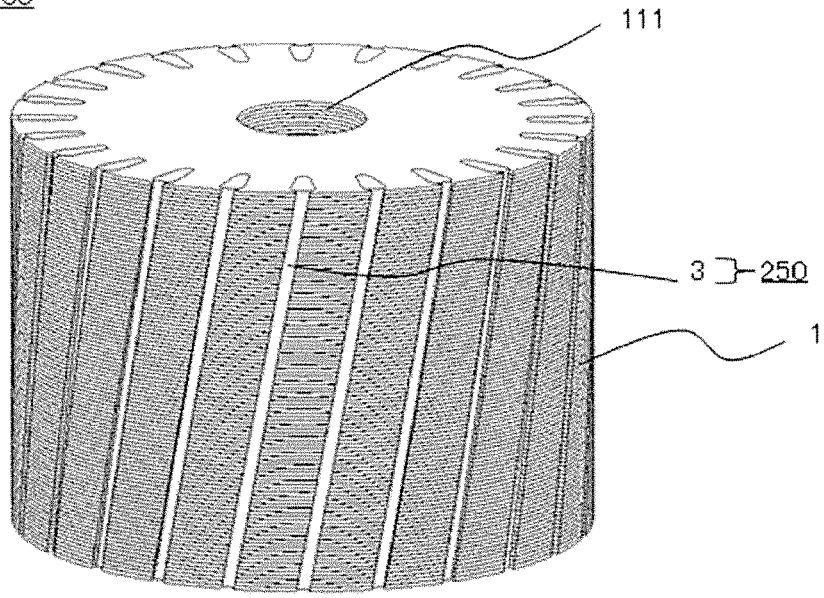
FIG. 23 is a perspective view in which end rings are omitted from a squirrel-cage rotor according to an eighth embodiment of the present invention.

FIG. 23 is a perspective view in which end rings are omitted from a squirrel-cage rotor according to an eighth embodiment of the present invention. A squirrel-cage rotor 300 illustrated in FIG. 23 includes the rotor core 1 and the squirrel-cage conductor 250. The rotor core 1 is formed of the plurality of rotor core sheets of the squirrel-cage rotor 300 according to the fourth embodiment, which are laminated in the axial direction under a state of being rotated with respect to each other in the circumferential direction. The squirrel-cage conductor 250 includes the end rings 200 (not shown) and the conductors 3. Other configurations are the same as those in the fourth embodiment.

The plurality of rotor core sheets are laminated in the axial direction so that all central axes of the plurality of rotor teeth 12 of each of the plurality of rotor core sheets are shifted at a predetermined angle in the circumferential direction with respect to all central axes of the plurality of rotor teeth 12 of adjacent rotor core sheets. In other words, the rotor core 1 is skewed at a predetermined skew angle. Further, each of the rotor slots 13 passes through the rotor core in the axial direction. Thus, as in the fourth embodiment, the liquefied conductors 3 flow in the axial direction to be charged into the rotor slots 13 through die-casting.

Note that, the configuration is not limited to that illustrated in FIG. 23 as long as at least two of the plurality of rotor core sheets are laminated in the axial direction so that all central axes of the plurality of rotor teeth 12 of one of the at least two rotor core sheets, and all central axes of the rotor teeth 12 of another of the at least two rotor core sheets are shifted in the circumferential direction with respect to each other.

Further, as described in the second embodiment and the fifth embodiment, the closing portion 2 may not be coupled in the axial direction through caulking or the like. As illustrated in FIG. 15 of the fourth embodiment, the closing portion 2 is formed so as to be increased in circumferential width from the radially inner side toward the radially outer side. With this, the closing portion 2 can be removed by being moved to the radially outer side.

Note that, the closing portion 2 may be formed so as to be uniform in circumferential width from the radially inner side toward the radially outer side. Also with this configuration, the closing portion 2 can be removed by being moved to the radially outer side.

Figure 24:
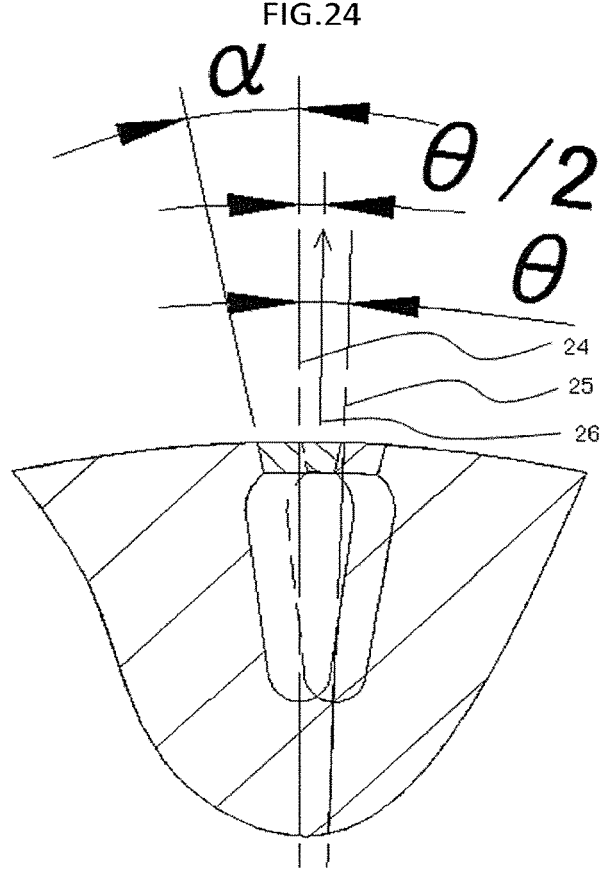
FIG. 24 is an enlarged view for illustrating a main part of the squirrel-cage rotor according to the eighth embodiment of the present invention.

FIG. 24 is an enlarged view for illustrating a main part of the squirrel-cage rotor according to this embodiment. When coupling the closing portion 2 in the axial direction through caulking or the like, as illustrated in FIG. 24, in the same rotor core sheet, the angle α, which is formed between a surface of the closing portion 2 held in contact with the rotor slot opening 131, that is, a circumferential side surface of the closing portion 2, and a central axis of the rotor slot 13, needs to be equal to or higher than a predetermined angle. In this case, when the circumferential width of the closing portion 2 is increased from the radially inner side toward the radially outer side, the angle α takes a positive value.

In FIG. 24, the coupled closing portion 2 is removed by being moved in a direction 26 corresponding to ½ of the maximum value θ of an angle at which a central axis 24 of the rotor slot (solid lines) of one of the rotor core sheets, and a central axis 25 of the rotor slot 13 (broken lines) of another of the rotor core sheets, which is continuous with the rotor slot 13 of the one of the rotor core sheets, are shifted with respect to each other in the circumferential direction. In this case, when angles in such a direction that the circumferential width of the closing portion 2 is increased from the radially inner side toward the radially outer side are assumed to be positive, a minimum value of an angle between the circumferential side surface of the closing portion 2 and the direction 26 needs to be 0° or more. Thus, the predetermined angle is ½ of the maximum value θ of the angle at which the central axis 24 of the rotor slot 13 of the one of the rotor core sheets, and the central axis 25 of the rotor slot 13 of the another of the rotor core sheets, which is continuous with the rotor slot 13 of the one of the rotor core sheets, are shifted with respect to each other in the circumferential direction. Therefore, the angle α is θ/2 or more.

This configuration allows the closing portion 2 to be removed by being moved to the radially outer side even when the closing portion 2 is coupled in the axial direction. Further, the closing portion 2 is coupled in the axial direction through caulking or the like, and hence work hours for removing the closing portion 2 can be reduced to be shorter than that in the case where the closing portion 2 is not coupled in the axial direction.

As described above, in the squirrel-cage rotor 300 according to this embodiment, at least two of the plurality of rotor core sheets are laminated in the axial direction so that all the central axes of the plurality of rotor teeth 12 of the one of the at least two rotor core sheets, and all the central axes of the rotor teeth 12 of the another of the at least two rotor core sheets are shifted in the circumferential direction with respect to each other. With this configuration, harmonic components of torque pulsation can be suppressed in the rotary electric machine 500 using the squirrel-cage rotor 300 according to this embodiment. A main component of the harmonic components of the torque pulsation can also be reduced by designing such an angle that the rotor core sheets are shifted with respect to each other in the circumferential direction.

Note that, as illustrated in FIG. 24, the skew angle of the rotor core 1 is not limited to be uniform in the axial direction, and may be varied in the axial direction. Specifically, the skew angle may be formed toward the opposite side in the circumferential direction from a position of substantially ½ in the axial direction of the squirrel-cage rotor 300. In this case, an axial torque component generated by the skew is counterbalanced. Thus, a thrust force is not generated in the bearings of the rotary electric machine 500, which leads to an effect in that the life of the bearing is prolonged.

Note that, as a matter of course, the squirrel-cage rotors 300 can be manufactured through the manufacturing method for the squirrel-cage rotor 300 according to the second embodiment by combining any one of the squirrel-cage rotors 300 according to the third embodiment to the sixth embodiment, in which the closing portion 2 is formed so as to be increased or uniform in circumferential width from the radially inner side toward the radially outer side, and the squirrel-cage rotor 300 according to this embodiment. Further, those squirrel-cage rotors 300 each have the effects described respectively in the third embodiment to the sixth embodiment.

REFERENCE SIGNS LIST 1 rotor core, 2 closing portion, 3 conductor, 4 steel sheet, 11 rotor core central portion, 12 rotor tooth, 13 rotor slot, 14 through-hole, 15 slit portion, 16 coupling portion, 17 caulking portion, 21 wide portion, 22 protruding portion, 23 recessed portion, 24 central axis of rotor slot of one of rotor core sheets, 25 central axis of rotor slot of another of rotor core sheets, which is continuous with rotor slot of one of rotor core sheets, 26 direction corresponding to ½ of maximum value θ of angle at which central axis 24 and central axis 25 are shifted in circumferential direction, 31 radially outer-side surface, 110 shaft, 111 shaft hole, 121 flange portion, 122 recessed portion, 123 protruding portion, 131 rotor slot opening, 200 end ring, 201 first surface, 202 second surface, 203 projection, 204 part corresponding to surface of conductor on radially outer side, 205 projection, 250 squirrel-cage conductor, 300 squirrel-cage rotor, 400 stator, 401 stator core, 402 coil, 403 stator slot, 404 core back, 405 stator tooth, 500 rotary electric machine.

The invention claimed is:
1. A squirrel-cage rotor manufacturing method, comprising:
punching a steel sheet to cut out a rotor slot;
punching the steel sheet at a radially outer part of the rotor slot to form a closing portion;
arranging the closing portion at the radially outer part of the rotor slot that was punched out of the steel sheet at the radially outer part of the rotor slot;
arranging, through die-casting, a conductor into the rotor slot formed along a radially outer part of a rotor core; and
performing the die-casting under a state in which the radially outer part of the rotor slot is closed with the closing portion that was punched out of the steel sheet and is made of the same material as a material of the rotor core.
2. A squirrel-cage rotor manufacturing method according to claim 1, further comprising:

forming the closing portion so that a circumferential width of the closing portion increases from a radially inner side toward a radially outer side.

3. A squirrel-cage rotor manufacturing method according to claim 1, further comprising:
    forming the closing portion to include protruding portions that protrude towards a circumferentially outer side or recessed portions that retract towards a circumferentially inner side.

4. A squirrel-cage rotor manufacturing method according to claim 1,
    wherein the closing portion comprises a plurality of closing sheets laminated in an axial direction of a squirrel-cage rotor, and
    wherein the die-casting is performed under a state in which the plurality of closing sheets laminated in the axial direction are coupled to each other.

5. A squirrel-cage rotor manufacturing method according to claim 1, further comprising:
    forming the closing portion to include a wide portion having a circumferential width larger than a circumferential width of a radially outer part of the rotor slot; and
    the performing the die-casting is performed under a state in which the wide portion is held in surface contact with an outer peripheral surface of the rotor core from the radially outer side.

6. A squirrel-cage rotor manufacturing method according to claim 1, further comprising:
    forming the closing portion so that a circumferential width of the closing portion decreases from a radially inner side toward a radially outer side.

7. A squirrel-cage rotor manufacturing method according to claim 1, further comprising:
    forming recessed portions that are recessed to a circumferentially inner side.

8. A squirrel-cage rotor, comprising:
    a rotor core comprising:
        a plurality of rotor core sheets that are laminated in an axial direction of the squirrel-cage rotor; and
        a rotor slot formed along a radially outer part of the rotor core; and
    a conductor formed at a radially inner part of the rotor slot,
    wherein a surface of the conductor, which is exposed on a radially outer side, includes a plurality of projections from the conductor formed at positions along a direction of the lamination surfaces of the plurality of rotor core sheets and separated from each other along the axial direction of the squirrel-cage rotor, and
    the lamination surfaces are between the plurality of rotor core sheets.

9. A squirrel-cage rotor according to claim 8,
    wherein the rotor core comprises a plurality of rotor teeth arranged side by side in a circumferential direction of the rotor core,
    wherein the rotor slot is formed of adjacent two of the plurality of rotor teeth along the radially outer part of the rotor core,
    wherein the plurality of rotor teeth each comprises, at both circumferential end portions thereof:
        flange portions formed so as to protrude to a circumferentially outer side and to be uniform in circumferential width from a radially inner side toward the radially outer side; or
        flange portions formed so as to protrude to the circumferentially outer side and to be increased in circumferential width from the radially inner side toward the radially outer side;
    wherein at least two of the plurality of rotor core sheets are laminated in the axial direction so that all central axes of the plurality of rotor teeth of one of the at least two of the plurality of rotor core sheets, and all central axes of the plurality of rotor teeth of another of the at least two of the plurality of rotor core sheets, are shifted in the circumferential direction with respect to each other, and
    wherein the rotor slot is formed so as to pass through the rotor core in the axial direction.

10. A squirrel-cage rotor according to claim 8, wherein a surface of the rotor core, which forms the rotor slot, includes a projection formed on the radially outer side with respect to the conductor.

11. A squirrel-cage rotor, comprising:
    a rotor core comprising:
        a plurality of rotor core sheets that are laminated in an axial direction of the squirrel-cage rotor; and
        a rotor slot formed along a radially outer part of the rotor core; and
    a conductor formed at a radially inner part of the rotor slot,
    wherein a surface of the conductor, which is exposed on a radially outer side, comprises:
        first surfaces including positions along lamination surfaces of the plurality of rotor core sheets,
        second surfaces each arranged between a different pair of first surfaces, and having different surface roughness from the first surfaces, and
        the first surfaces and the second surfaces being arranged alternately along the axial direction.

12. A squirrel-cage rotor according to claim 11,
    wherein the surface roughness of the first surfaces is higher than the surface roughness of the second surfaces.

* * * * *